(12) United States Patent
Ohtake

(10) Patent No.: US 7,848,028 B2
(45) Date of Patent: Dec. 7, 2010

(54) VARIABLE FOCAL LENGTH LENS SYSTEM

(75) Inventor: Motoyuki Ohtake, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/458,708

(22) Filed: Jul. 21, 2009

(65) Prior Publication Data

US 2010/0033836 A1     Feb. 11, 2010

(30) Foreign Application Priority Data

Aug. 6, 2008     (JP) ............................. 2008-202967

(51) Int. Cl.
*G02B 15/14* (2006.01)
(52) U.S. Cl. ...................................... 359/683; 359/676
(58) Field of Classification Search ................. 359/676, 359/683
See application file for complete search history.

(56) References Cited

U.S. PATENT DOCUMENTS 6,061,180 A  *  5/2000 Hayakawa ................... 359/557

FOREIGN PATENT DOCUMENTS

| JP | 04-070708 A | 3/1992 |
|---|---|---|
| JP | 07-253539 A | 10/1995 |
| JP | 11-352402 A | 12/1999 |
| JP | 2002-062478 A | 2/2002 |
| JP | 2006-085155 A | 3/2006 |
| JP | 2006-189598 | 7/2006 |
| JP | 2007-079194 | 3/2007 |
| JP | 2007-108398 A | 4/2007 |
| JP | 2007-292994 | 11/2007 |
| JP | 2008-015251 | 1/2008 |

OTHER PUBLICATIONS

Japanese Office Action issued Apr. 15, 2010 for corresponding Japanese Application No. 2008-202967.

* cited by examiner

*Primary Examiner*—Scott J Sugarman
(74) *Attorney, Agent, or Firm*—Rader, Fishman & Grauer PLLC

(57) ABSTRACT

A variable focal length lens system includes: a first lens group having a positive refracting power; a second lens group having a negative refracting power; a third lens group having a positive refracting power; a fourth lens group having a negative refracting power; a fifth lens group having a negative refracting power; and a sixth lens group having a positive refracting power; the first to sixth lens groups being disposed in order from an object side.

6 Claims, 21 Drawing Sheets

VARIABLE FOCAL LENGTH LENS SYSTEM

BACKGROUND OF THE INVENTION

1. Field of the Invention

This invention relates to a variable focal length lens system, and more particularly to a technical field of a variable focal length lens system which is used for video cameras, digital still cameras and so forth and has a zoom ratio higher than 20 times.

2. Description of the Related Art

In related art, a method is known wherein an image pickup device which uses a photoelectric conversion element such as a CCD (Charge Coupled Device) element or a CMOS (Complementary Metal Oxide Semiconductor) element as recording means for a camera is used such that the amount of light of an image of an image pickup object formed on a face of the image pickup element is converted into and recorded as an electric output.

Further, together with the progress of a microprocessing technique in recent years, enhancement of the operation speed of a central processing unit and the integration of a storage medium has been achieved. Thus, it has become possible to carry out a high speed process of a large amount of image data which has been impossible to handle in related art.

Further, enhancement of the integration and miniaturization of a light receiving element have been achieved, and such high integration has made it possible to record a higher spatial frequency and such miniaturization has achieved miniaturization of the entire camera.

However, such high integration and miniaturization of a light receiving element as described above have decreased the light receiving area of individual photoelectric conversion elements and decreases the electric output power. This has given rise to a problem that the influence of noise increases.

In order to prevent the influence of noise caused by such decrease of the electric output power as described above, several countermeasures are taken in related art. One of the countermeasures is to increase the amount of light which comes into a light receiving element by increasing the aperture ratio of the optical system. Another countermeasure is to dispose a microlens array, which includes an array of very small lenses, immediately forwardly of individual light receiving elements.

While a microlens array introduces light fluxes, which are directed to portions between adjacent ones of light receiving elements, to the light receiving elements, it provides a restriction to the position of the exit pupil of the lens system. If the position of the exit pupil of the lens system approaches the light receiving elements, that is, if the angle of a main light flux, which comes to a light receiving element, with respect to the optical axis becomes great, then an off-axis ray directed to a peripheral portion of the screen defines a great angle with respect to the optical axis. As a result, the light flux fails to come to the light receiving element, resulting in shortage in light amount.

In recent years, together with popularization of a digital camera, the needs of users have diversified. Particularly, a demand for a camera which incorporates a zoom lens having a high power variation ratio while miniaturization of the same is assured is increasing.

As one of zoom lenses of zoom types used in related art, a zoom lens of a variable focal length lens system having a four-group configuration of positive, negative, positive, and positive powers is known.

A zoom lens of the four-group configuration includes a first lens group having a positive refracting power, a second lens group having a negative refracting power, a third lens group having a positive refracting power, and a fourth lens group having a positive refracting power, disposed in order from the object side. A zoom lens of the type described is disclosed, for example, in Japanese Patent Laid-Open No. 2006-189598 (hereinafter referred to as Patent Document 1).

Generally in a zoom lens, as the number of movable lens groups increases, the degree of freedom in selection of a zoom locus of each lens group from a wide angle end state to a telephoto end state increases. Therefore, it is known that, even if the zoom lens has a high power variation ratio, a high performance can be implemented as disclosed, for example, in Japanese Patent Laid-Open No. 2007-79194 (hereinafter referred to as Patent Document 2) or Japanese Patent Laid-Open No. 2007-292994 (hereinafter referred to as Patent Document 3). In the zoom lenses disclosed in Patent Document 2 and Patent Document 3, an additional lens group fixed in the direction of the optical axis is disposed on the image side of a known zoom lens having a four-group configuration of positive, negative, positive, and positive powers.

Also a zoom lens which achieves a high power variation ratio and a high performance is known and disclosed, for example, in Japanese Patent Laid-Open No. 2008-15251 (hereinafter referred to as Patent Document 4) although this is an interchangeable lens.

The zoom lens disclosed in Patent Document 4 includes six lens groups including a first lens group having a positive refracting power, a second lens group having a negative refracting power, a third lens group having a positive refracting power, a fourth lens group having a negative refracting power, a fifth lens group having a negative refracting power, and a sixth lens group having a positive refracting power and disposed in this order from the object side. In the zoom lens, when the lens position state varies from a wide angle end state to a telephoto end state, the lens groups move along the direction of the optical axis such that the distance between the first and second lens groups increases, the distance between the second and third lens groups decreases, the distance between the third and fourth lens groups increases, the distance between the fourth to fifth lens groups increases, and the distance between the fifth and sixth lens groups decreases.

SUMMARY OF THE INVENTION

However, such a zoom lens of a four-group configuration of positive, negative, positive, and positive powers as disclosed in Patent Document 1 has a problem in that, if it is tried to assure a high power variation ratio exceeding 20 times, then it becomes difficult to achieve sufficient miniaturization as described below.

Generally, in a zoom lens, the power variation ratio can be increased without increasing the optical overall length by increasing the refracting power of the lens groups.

However, if the refracting power of the lens groups is increased, then it becomes impossible to correct variation of various aberrations which appear when the focal length varies, resulting in failure to achieve a predetermined optical performance. Accordingly, where a predetermined optical performance is achieved, miniaturization cannot be achieved and increase in scale cannot be avoided.

Further, in a zoom lens of a four-group configuration of positive, negative, positive, and positive powers, the variation of the height of an off-axis light flux which passes through the third and fourth lens groups is small even if the lens position state varies. Therefore, it is necessary to set the power variation action and the aberration correction action of the first and second lens groups to high levels, and this makes it difficult to assure miniaturization and a high power variation ratio.

On the other hand, where the number of movable lens groups is increased, the degree of freedom in selection of the zoom locus of each lens group increases, and consequently, variation of various aberrations which appear when the focal length varies can be corrected favorably. Therefore, even where the power variation ratio is high, miniaturization can be achieved.

However, where a fixed lens group is disposed on the image side of a zoom lens of a four-group configuration of positive, negative, positive, and positive powers like the zoom lenses disclosed in Patent Document 2 and Patent Document 3, the number of lens groups which contribute to power variation does not increase. Therefore, it is difficult to achieve both of further increase of the power variation ratio and further miniaturization.

Meanwhile, if the number of lens groups is increased as in the case of the zoom lens disclosed in Patent Document 4, then even if the power variation ratio is raised, it is possible to assure miniaturization. However, since the number of lens groups which move in the direction of the optical axis is five and increases from that in the related zoom lenses, the zoom lens has a problem in that the lens barrel structure is complicated.

Further, the zoom lens disclosed in Patent Document 4 is configured such that the third and sixth lens groups are moved integrally with each other. However, in order to move the sixth lens group upon focusing on a short distance, it is necessary to move the sixth lens group independently of the third lens group. Accordingly, in this instance, the zoom lens must be modified so that the third and sixth lens groups move independently of each other, and the lens barrel structure is complicated likewise.

Therefore, it is desirable to provide a variable focal length lens system which solves the problems described above and can achieve enhancement of the magnifying power and miniaturization without complicating a lens barrel structure.

According to an embodiment of the present invention, there is provided a variable focal length lens system, including a first lens group having a positive refracting power, a second lens group having a negative refracting power, a third lens group having a positive refracting power, a fourth lens group having a negative refracting power, a fifth lens group having a negative refracting power, and a sixth lens group having a positive refracting power, the first to sixth lens groups being disposed in order from an object side. Variation of a lens position state from a wide angle end state to a telephoto end state causes increase of the distance between the first and second lens groups, decrease of the distance between the second and third lens groups, increase of the distance between the third and fourth lens groups, decrease of the distance between the fourth and fifth lens groups, and variation of the distance between the fifth and sixth lens groups while the first lens group first moves to an image side once and then moves to the object side and the fourth lens group is fixed in the direction of the optical axis and besides the third and fifth lens groups move integrally with each other to the object side. The second lens group is positioned on the image side in the telephoto end state in comparison with the position thereof in the wide angle end state. The variable focal length lens system further includes an aperture stop disposed in the proximity of the third lens group. The sixth lens group is moved in the direction of the optical axis in response to variation of the position of an image pickup object.

In the variable focal length lens system, the third and fifth lens groups are moved integrally with each other in the direction of the optical axis on the opposite sides across the fourth lens group, which is formed as a fixed group, in response to variation of the lens position state.

Preferably, the variable focal length lens system is configured such that, where the combined focal length of the first to fourth lens groups in the wide angle end state is represented by f14w and the focal length of the entire lens system in the wide angle end state is represented by fw, the following conditional expression (1) is satisfied $$1.2 < f14w/fw < 3 \quad (1)$$

where the variable focal length lens system is configured so as to satisfy the conditional expression (1) above, an off-axis light flux which passes through the fifth and sixth lens groups is not spaced by a great distance from the optical axis.

Preferably, the variable focal length lens system is configured such that, where the lateral magnifying power of the second lens group in the wide angle end state is represented by β2w and the lateral magnifying power of the second lens group in the telephoto end state is represented by β2t, the following conditional expressions (2) and (3) are satisfied $$-1 < \beta 2w < 0 \quad (2)$$

$$\beta 2t < -1 \quad (3)$$

where the variable focal length lens system is configured so as to satisfy the conditional expressions (2) and (3), the lens diameter of the first lens group does not become excessively great and the amount of movement of the sixth lens group necessary when the lens position state varies increases.

Preferably, the variable focal length lens system is configured such that, where an optical overall length which is the distance from a lens face of the first lens group positioned nearest to the object side to an image surface in the telephoto end state is represented by TLt, the focal length of the entire lens system in the telephoto end state is represented by ft, and an optical overall length which is the distance from the lens face of the first lens group positioned nearest to the object side to the image surface in the wide angle end state is represented by TLw, the following conditional expressions (4) and (5) are satisfied $$0.8 < TLt/ft < 1 \quad (4)$$

$$0.8 < TLw/TLt < 1 \quad (5)$$

where the variable focal length lens system is configured so as to satisfy the conditional expressions (4) and (5), the refracting power of the first and second lens groups does not become excessively high and the lens total length in the telephoto end state becomes appropriate.

Preferably, the variable focal length lens system is configured such that, where a back focus which is the distance from a lens face of the sixth lens group positioned nearest to the image side to an image surface in the wide angle end state is represented by Bfw and a maximum image height is represented by Ymax, the following conditional expression (6) is satisfied $$1.5 < Bfw/Ymax < 4 \quad (6)$$

where the variable focal length lens system is configured so as to satisfy the conditional expression (6), the lens diameter of the sixth lens group does not become excessively great and the diameter of an on-axis light flux and an off-axis light flux does not become excessively small.

Preferably, the variable focal length lens system is configured such that, where the combined focal length of the first and second lens groups in the telephoto end state is represented by f12t, the following conditional expression (7) is satisfied $$0.7 < |f12t|/ft < 1 \tag{7}$$

where the variable focal length lens system is configured so as to satisfy the conditional expression (7), the combined refracting power of the first and second lens groups becomes appropriate.

In summary, with the variable focal length lens system, enhancement of the magnifying power and miniaturization can be implemented without complicating the lens barrel structure.

The above and other features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Figure 1:
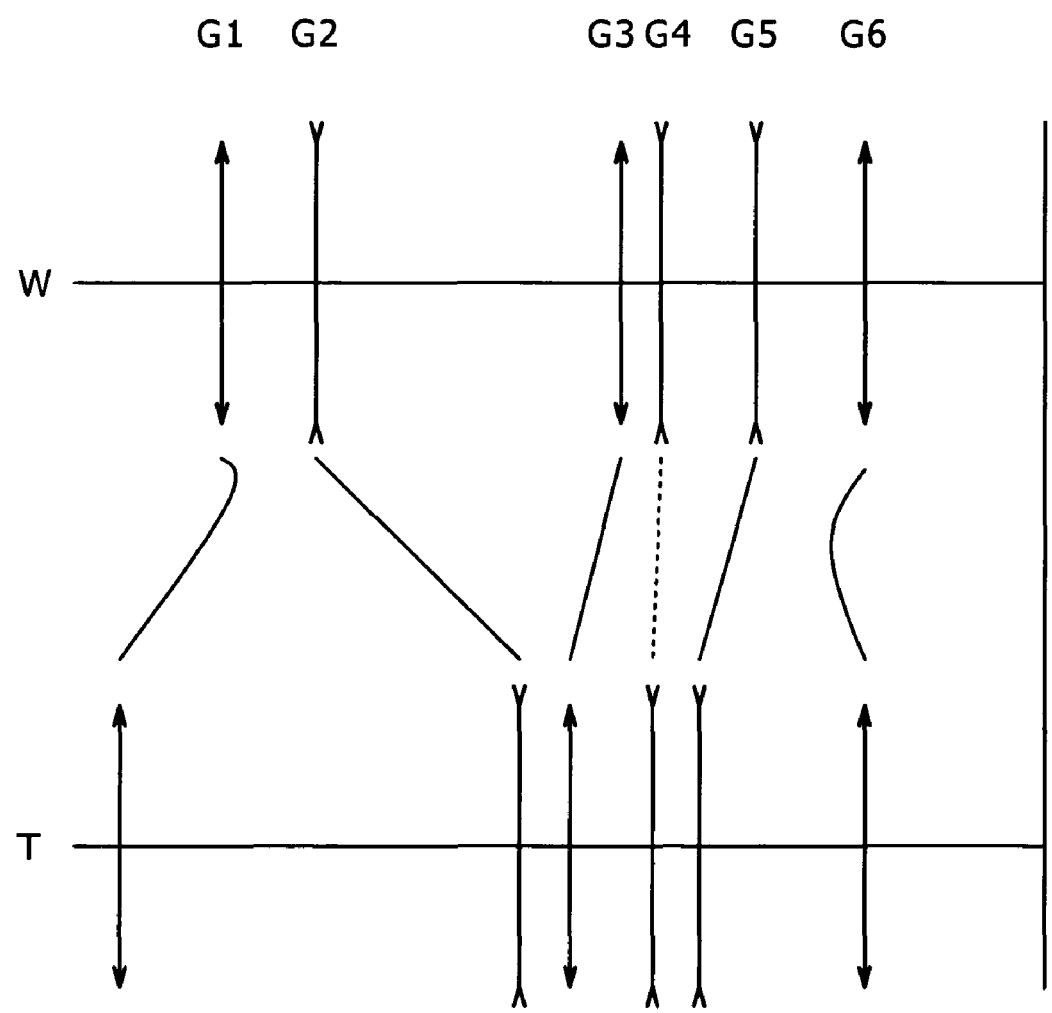
FIG. 1 is a view schematically illustrating arrangement of refracting powers of a variable focal length lens system according to embodiments of the present invention.

In the following, preferred embodiments of the present invention wherein it is applied to a variable focal length lens system are described.

According to an embodiment of the present invention, a variable focal length lens system includes a first lens group having a positive refracting power, a second lens group having a negative refracting power, a third lens group having a positive refracting power, a fourth lens group having a negative refracting power, a fifth lens group having a negative refracting power, and a sixth lens group having a positive refracting power, disposed in order from an object side.

In the variable focal length lens system, when the lens position state varies from the wide angle end state to the telephoto end state, the distance between the first and second lens groups increases; the distance between the second and third lens groups decreases; the distance between the third and fourth lens groups increases; the distance between the fourth and fifth lens groups decreases; and the distance between the fifth and sixth lens groups varies.

Further, in the variable focal length lens system, when the lens position state varies from the wide angle end state to the telephoto end state, the first lens group first moves to the image side once and then moves to the object side while the fourth lens group is fixed in the direction of an optical axis and the third and fifth lens groups move integrally with each other to the object side.

In addition, in the variable focal length lens system, the second lens group is positioned on the image side in the telephoto end state in comparison with the position thereof in the wide angle end state, and an aperture stop is disposed in the proximity of the third lens group. Further, the sixth lens group moves in the direction of the optical axis in response to variation of the position of the image pickup object.

In the following, positional relationships and roles of the first to sixth lens groups are described.

The first and second lens groups are disposed in the proximity of each other in the wide angle end state so that an off-axis light flux which passes through the first lens group may not extremely be spaced away from the optical axis. Further, in the wide angle end state, the distance between the second and third lens groups is increased so that an off-axis light flux which passes through the second lens group may pass a position spaced a little from the optical axis.

When the lens position state varies from the wide angle end state to the telephoto end state, the distance between the first and second lens groups increases, and consequently, an off-axis light flux which passes through the first lens group is spaced away from the optical axis. Simultaneously, the distance between the second and third lens groups decreases, and consequently, an off-axis light flux which passes through the second lens group comes near to the optical axis.

By configuring the first and second lens groups in such a manner as described above, the amount of aberrations caused by the first lens group in the wide angle end state is small, and the variation of the comatic aberration which appears in response to variation of the angle of view in the telephoto end state is corrected favorably. Since an on-axis light flux and an off-axis light flux pass positions of the second lens group spaced away from each other in the wide angle end state, variation principally of the comatic aberration which appears in response to variation of the angle of view is corrected favorably and variation of an off-axis aberration by variation of the lens position state is corrected favorably.

It is to be noted that, in the embodiment of the present invention, in order to make small the effective diameter of lenses of the first lens group which is positioned most on the object side, when the lens position state varies from the wide angle end state to the telephoto end state, the first lens group first moves to the image side once and then moves to the object side.

Since the first lens group first moves to the image side once and then moves to the object side in this manner, the distance between the second and third lens groups in the wide angle end state can be increased further. Accordingly, it becomes possible to reduce the refracting power of the lens groups, and deterioration in performance by very small eccentricity which appears upon fabrication can be moderated.

Further, since the first lens group first moves to the image side once and then moves to the object side, even if the distance between the first and second lens groups increases to decrease the angle of view, an off-axis light flux which passes through the first lens group can be prevented from being spaced away from the optical axis suddenly.

As described above, the second lens group is positioned on the image side in the telephoto end state in comparison with that in the wide angle end state. Therefore, in the telephoto end state, the distance between the first and second lens groups increases. Accordingly, the second lens group takes charge of a power variation action.

The third lens group has a positive refracting power and the aperture stop is disposed in the proximity of the third lens group. Therefore, the third lens group principally plays a role of correcting an on-axis aberration.

Where the aperture stop is disposed in the proximity of the center of the lens system, that is, in the proximity of the center in the overall lens length, an off-axis light flux which passes through the lens groups is not extremely spaced away from the optical axis, and there is an advantage that appearance of aberrations can be suppressed. Further, where at least one movable lens group is disposed on each of the object side and the image side across the aperture stop, since the height of an off-axis light flux which passes through the movable lens groups varies in response to variation of the lens position state, variation of an off-axis aberration caused by variation of the lens position state can be corrected favorably.

Therefore, in the variable focal length lens system according to the embodiment of the present invention, the aperture stop is disposed in the proximity of the third lens group so that variation of an off-axis aberration caused by variation of the lens position state can be suppressed and miniaturization of the lens diameter can be achieved.

The third lens group is likely to have a high refracting power in order to converge a light flux diverged strongly by the second lens group. Where the aperture stop is disposed in the proximity of the third lens group, since an off-axis light flux which passes through the third lens group passes in the proximity of the optical axis, the amount of an off-axis aberration caused by the third lens group is small. As a result, an on-axis aberration can be corrected effectively and optimally.

Further, when the third lens group moves to the object side when the lens position state varies from the wide angle end state to the telephoto end state, the overall lens length can be reduced.

Further, when the distance between the second and third lens groups varies by a great amount when the lens position state varies from the wide angle end state to the telephoto end state, the lateral magnifying power of the third lens group varies to raise the power variation ratio.

Furthermore, since the third lens group is moved in the direction of the optical axis, the amount of movement of the second lens group in the direction of the optical axis can be reduced to moderate the power variation action and a balance regarding the power variation action can be assured.

Both of the fourth and fifth lens groups have a negative refracting power as described hereinabove.

By disposing the two negative lens groups, that is, the fourth and fifth lens groups, on the image side with respect to the aperture stop in this manner, the refracting power disposition in the entire lens system approaches symmetrical disposition. Consequently, correction of a distortional aberration and a magnification chromatic aberration can be carried out simply.

In particular, the fourth and fifth lens groups can be regarded not as lens groups which take charge of a power variation action but as a single lens group, and consequently, the variable focal length lens system can be regarded as a symmetrical system having positive, negative, positive, negative (fourth and fifth lens groups) and positive powers disposed in order from the object side. Consequently, correction of a distortional aberration and a magnification chromatic aberration can be carried out simply.

Particularly where the fourth and fifth lens groups are disposed such that the distance therebetween increases in the wide angle end state, the combined negative refracting power can be increased and a negative distortional aberration which is likely to appear in the wide angle end state can be corrected favorably.

Further, where the distance between the fourth and fifth lens groups decreases in the telephoto end state, the combined negative refracting power can be decreased and reduction of the lens total length in the telephoto end state can be achieved by this.

Where the distance between the third and fourth lens groups in the wide angle end state is reduced, it is possible to displace an off-axis light flux which passes through the fifth lens group away from the optical axis thereby to favorably correct a negative distortional aberration principally by means of the fifth lens group.

Where the distance between the third and fourth lens groups in the telephoto end state is increased, the convergence action by the third lens group can be raised to achieve reduction of the overall lens length.

The sixth lens group takes charge of a compensation function of keeping the position of the image surface fixed and further takes charge of a focusing function of suppressing variation of the image surface position caused by variation of the position of the image pickup object to keep the image surface position fixed.

Since the six lens group is disposed in the proximity of the image surface position, an off-axis light flux passes in a spaced relationship from an on-axis light flux, and this is suitable for correction of an off-axis aberration. Further, since the sixth lens group is disposed away from the aperture stop, it can be disposed to a position proximate to an image side telecentric system readily. Further, since the variation of the height of an off-axis light flux which passes through the sixth lens group when it moves upon focusing is small, also aberration fluctuation by the distance to the image pickup object can be suppressed.

In the variable focal length lens system according to the embodiment of the present invention, the power variation action and the aberration correction action by the third and succeeding lens groups are enhanced to achieve a higher power variation action by a smaller size than that by the related zoom lens of the four-group configuration of positive, negative, positive, and positive powers. Further, since particularly the two configurations given in (A) and (B) below are adopted, increase of the power variation ratio and miniaturization can be implemented without giving rise to complication of the lens barrel structure.

(A) A fixed lens group is disposed in a lens system and configured so as to contribute to power variation.

(B) Two movable lens groups are configured so as to move integrally with each other to suppress complication of the lens barrel structure.

In regard to (A), paying attention to the fact that the lateral magnifying power varies where a movable lens group is disposed on both of the object side and the image side of the fourth lens group formed as a fixed lens group, the fixed lens group is configured so as to have a power magnifying action.

In order to provide the fixed lens group in this manner, it is necessary to move the third lens group to the object side, and since the sixth lens group is movable upon focusing, it is possible to provide the fourth or fifth lens group as the fixed lens group. However, where the configuration of (B) for moving the two movable lens groups integrally with each other is adopted, a movable lens group can be reduced finally where the fourth lens group is formed as a fixed lens group. Therefore, the fourth lens group is provided as a fixed lens group.

Further, since no fixed lens group moves in the direction of the optical axis, the necessity for cam driving is eliminated. Therefore, the influence upon the lens barrel structure is less significant and eccentricity which appears upon fabrication can be suppressed.

Meanwhile, as regards the configuration of (B) described above, the third and fifth lens groups which are both formed as movable lens groups are moved integrally with each other.

As regards the movable lens groups, when the lens position state varies from the wide angle end state to the telephoto end state, the distance between the third and fourth lens groups increases while the distance between the fourth and fifth lens groups decreases, and the third and fifth lens groups originally have a characteristic that the distance therebetween is proximate to a fixed value.

Further, since the fourth lens group is formed as a fixed lens group, although a connecting member for connecting the third and fifth lens groups to each other so as to allow integral driving of the third and fifth lens groups exists, complication of the lens barrel structure can be suppressed to a minimum level.

In addition, where two lens groups in the variable focal length lens system of the six-group configuration are driven integrally with each other while one lens group is formed as a fixed lens group, the number of blocks which move independently of each other becomes four. Consequently, increase of the power variation ratio and miniaturization can be implemented without giving rise to complication of the lens barrel structure.

In the variable focal length lens system having the configuration described above, since the signs of the refracting powers of the fourth and fifth lens groups are the same, further miniaturization and enhancement in performance can be achieved by taking notice of the convergence of an on-axis light flux going out from the fourth lens group.

In particular, the convergence of an on-axis light flux going out from the fourth lens group in the wide angle end state, that is, the combined focal length of the lens groups from the first to fourth lens groups, has an influence on reduction of the distortional aberration and the lens diameter. Therefore, the variable focal length lens system according to the embodiment of the present invention is preferably configured such that, where the combined focal length of the first to fourth lens groups in the wide angle end state is represented by f14w and the focal length of the entire lens system in the wide angle end state is represented by fw, the following conditional expression (1) is satisfied:

$$1.2 < f14w/fw < 3 \qquad (1)$$

The conditional expression (1) defines the combined focal length of the lens groups from the first to fourth lens groups.

If the combined focal length is greater than the upper limit value given by the conditional expression (1), then an off-axis light flux which passes through the fifth and sixth lens groups is spaced away from the optical axis. Accordingly, the lens diameter of the sixth lens group becomes excessively great with respect to the screen size, and this gives rise to increase in size of the driving mechanism and also of the lens barrel.

On the contrary, if the combined focal length is smaller than the lower limit value given by the conditional expression (1), then it is difficult to favorably correct a negative distortional aberration which appears in the wide angle end state.

Accordingly, where the variable focal length lens system satisfies the conditional expression (1), miniaturization of the driving mechanism and the lens barrel can be anticipated and a negative distortional aberration which appears in the wide angle end state can be corrected favorably.

Further, the variable focal length lens system of the embodiment of the present invention is preferably configured such that, where the lateral magnifying power of the second lens group in the wide angle end state is represented by β2w and the lateral magnifying power of the second lens group in the telephoto end state is represented by β2t, the following conditional expressions (2) and (3) are satisfied:

$$-1 < \beta 2w < 0 \quad (2)$$

$$\beta 2t < -1 \quad (3)$$

The conditional expressions (2) and (3) define the lateral magnifying powers of the second lens group.

In the wide angle end state, since the angle of view is great, an off-axis light flux which passes through the first lens group or the second lens group spaced far away from the image surface position is likely to be spaced away from the optical axis, and therefore the lens diameter is likely to increase. This increase of the lens diameter can be moderated by setting the combined refracting power of the first and second lens groups to a high negative refracting power. At this time, the lateral magnification of the second lens group ranges from −1 to 0.

If the lateral magnifying power is lower than the lower limit value of the conditional expression (2), then the lens diameter of the first lens group becomes very great.

On the other hand, if the lateral magnifying power is higher than the upper limit value of the conditional expression (2), then since the refracting power of the first lens group becomes negative, sufficient miniaturization cannot be achieved.

Meanwhile, if the lateral magnifying power is higher than the conditional expression (3), then the amount of movement of the sixth lens group necessary when the lens position state varies cannot be reduced, and this gives rise to such problems as increase in scale of the driving mechanism and space interference between the fifth and sixth lens groups.

If the lateral magnifying power β2t in the telephoto end state is lower than −1 where the lateral magnifying power β2w of the second lens group in the wide angle end state is within the region of from −1 to 0, then a position at which the lateral magnifying power of the second lens group is −1 exists intermediately between the wide angle end state and the telephoto end state. Since the direction of movement of the sixth lens group reverses across the position at which the lateral magnifying power is −1 (time), the range of movement of the sixth lens group can be narrowed.

Accordingly, if the variable focal length lens system satisfies the conditional expressions (2) and (3), then miniaturization by reduction of the internal space of the lens barrel can be anticipated.

It is to be noted that more preferably the upper limit value of the conditional expression (2) given hereinabove is set to −0.1 and the lower limit value is set to −0.3. Where the upper limit value is −0.1, in the wide angle end state, an off-axis light flux which passes through the second lens group is spaced by some distance away from the optical axis, and an on-axis aberration and an off-axis aberration can be corrected independently of each other. Therefore, variation of the comatic aberration caused by variation of the angle of view can be suppressed more favorably and further enhancement in performance can be achieved. Where the lower limit value is set to −0.3, the lens diameter of the first lens group can be reduced further.

Further preferably, the upper limit value of the conditional expression (3) is set to −1.2. Where the upper limit value of the conditional expression (3) is set to −1.2, further reduction in space can be anticipated.

Preferably, the variable focal length lens system of the embodiment of the present invention is configured such that, where an optical overall length which is the distance from a lens face of the first lens group which is positioned nearest to the object side to an image surface in the telephoto end state is represented by TLt, the focal length of the entire lens system in the telephoto end state is represented by ft, and a optical overall length which is the distance from the lens face of the first lens group which is positioned nearest to the object side to the image surface in the wide angle end state is represented by TLw, the following conditional expressions (4) and (5) are satisfied $$0.8 < TLt/ft < 1 \quad (4)$$

$$0.8 < TLw/TLt < 1 \quad (5)$$

The conditional expression (4) defines the ratio between the overall lens length and the focal length in the telephoto end state and is used to favorably correct an off-axis aberration in the telephoto end state.

If the ratio is lower than the lower limit value given by the conditional expression (4), then the positive refracting power of the first lens group is excessively high, resulting in failure to favorably correct the variation of an off-axis aberration which appears in response to variation of the angle of view in the telephoto end state. Consequently, it is difficult to assure a sufficient optical performance.

On the contrary, if the ratio is higher than the upper limit value given by the conditional expression (4), then the overall lens length in the telephoto end state becomes excessively great, resulting in failure to achieve miniaturization.

The conditional expression (5) is used to establish a balance between miniaturization and enhancement in performance.

If the ratio between the optical total lengths in the telephoto end state and the wide angle end state is higher than the upper limit value given by the conditional expression (5), then the distance between the second and third lens groups in the wide angle end state becomes small and the refracting power of the second lens group increases. Therefore, an off-axis light flux which passes through the second lens group in the wide angle end state approaches the optical axis, resulting in difficulty to favorably correct the variation of the comatic aberration caused by variation of the angle of view.

On the contrary, if the ratio is lower than the lower limit value given by the conditional expression (5), then the overall lens length in the telephoto end state becomes short. Consequently, an off-axis light flux which passes through the first lens group is spaced away from the optical axis and the lens diameter of the first lens group becomes excessively great.

Accordingly, where the variable focal length lens system satisfies the conditional expressions (4) and (5), a sufficient optical performance can be assured and miniaturization can be anticipated.

Preferably, the variable focal length lens system of the embodiment of the present invention is configured such that, where a back focus which is the distance from a lens face of the sixth lens group which is positioned nearest to the image side to an image surface in the wide angle end state is represented by Bfw and a maximum image height is represented by Ymax, the following conditional expression (6) is satisfied $$1.5 < Bfw/Ymax < 4 \quad (6)$$

The conditional expression (6) defines the back focus in the wide angle end state.

If the back focus is higher than the upper limit value given by the conditional expression (6), then if it is tried to maintain the exit pupil position, then the lens diameter of the sixth lens group becomes large. On the other hand, if the exit pupil position is varied, then an off-axis light flux which passes through the sixth lens group approaches the optical axis and the on-axis light flux diameter increases. Therefore, it becomes difficult to correct an on-axis aberration and an off-axis aberration independently of each other, and sufficient enhancement of a performance cannot be achieved.

On the contrary, if the back focus becomes lower than the lower limit given by the conditional expression (6), then the diameter of an on-axis light flux and an off-axis light flux becomes small. This gives rise to a problem that a shadow of dust sticking to the image side lens face of a lens disposed most to the image side from within the sixth lens group is recorded in an overlapping relationship with an image of an image pickup object.

Accordingly, where the variable focal length lens system satisfies the conditional expression (6), sufficient enhancement in performance can be anticipated and recording of a shadow of dust in an overlapping relationship with an image of an image pickup object can be prevented.

Preferably, the variable focal length lens system of the embodiment of the present invention is configured such that, where the combined focal length of the first and second lens groups in the telephoto end state is represented by f12t, the following conditional expression (7) is satisfied $$0.7 < |f12t|/ft < 1 \qquad (7)$$

The conditional expression (7) defines the combined focal length of the first and second lens groups in the telephoto end state and is used to establish a balance between reduction of the lens diameter and reduction of the overall lens length.

If the combined focal length exceeds an upper limit value given by the conditional expression (7), then since the combined refracting power of the first and second lens groups becomes weak to the negative, an off-axis light flux which passes through the first lens group is spaced away from the optical axis, resulting in increase of the lens diameter.

On the contrary, if the combined focal length becomes lower than the lower limit value given by the conditional expression (7), then the combined refracting power of the first and second lens groups becomes weak to the positive. Therefore, it becomes difficult to reduce the overall lens length in the telephoto end state.

Accordingly, where the variable focal length lens system satisfies the conditional expression (7), reduction of the lens diameter and the overall lens length can be anticipated.

In addition, preferably the variable focal length lens system of the embodiment of the present invention is configured so as to satisfy (a) to (j) given below.

(a) In order to achieve both of a high optical performance and miniaturization, the lens groups are configured in the following manner.

The first lens group is composed of three lenses including a cemented lens of a negative lens and a positive lens and one positive lens disposed in order from the object side.

With the first lens group, a negative spherical aberration is likely to appear since an on-axis light axis comes in with a great light flux diameter particularly in the telephoto end state. Further, an off-axis aberration is likely to appear with the first lens group since an off-axis light flux comes in at a position spaced away from the optical axis.

Accordingly, where the cemented lens of a negative lens and a positive lens is disposed most on the object side of the first lens group, a negative spherical aberration and an on-axis chromatic aberration can be corrected favorably. The positive lens disposed on the image side of the cemented lens principally has a function of favorably correcting variation of the comatic aberration caused by variation of the angle of view. Thus, a high optical performance can be implemented by definitely allocating the different functions to the individual lenses.

It is to be noted that, in order to achieve further enhancement in performance, the two lenses positioned on the object side in the first lens group may be formed from a negative lens and a positive lens which are disposed in order from the object side but not adhered to each other. Or, the first lens group may be composed of four lenses including a cemented lens of a negative lens and a positive lens and two positive lenses disposed in order from the object side.

(b) In order to more favorably correct various aberrations which occur with the second lens group to achieve a higher optical performance, the second lens group is formed from two partial groups including first and second partial groups.

The first partial group is formed from a negative lens of a meniscus shape having a concave face directed to the image side.

Where the first partial group is formed from a negative lens of a meniscus shape whose concave face is directed to the image side, it is disposed in a spaced relationship from the aperture stop in the wide angle end state. Therefore, the height of a light flux which passes through the first partial group varies by a great amount in response to variation of the angle of view, and correction of an off-axis aberration can be carried out favorably.

Meanwhile, the second partial group is formed from at least one negative lens and one positive lens such that the negative lens of a biconcave shape and the positive lens whose convex face is directed to the object side are disposed in order from the object side.

In this instance, the positive lens and the negative lens of the second partial group can be formed as a cemented lens to achieve simplification of the configuration. Also it is possible to form the positive lens from a cemented lens of a positive lens and a negative lens to achieve further enhancement in performance.

Since the second partial group is disposed nearer to the aperture stop, it principally has a function of correcting an on-axis aberration. Accordingly, the second partial group preferably has a doublet configuration or a triplet configuration.

Where the second lens group is configured in such a manner as described above, the division of roles in aberration correction can be clarified to assure a good image formation performance.

(c) As a lens of the third lens group which is positioned most on the object side, a positive lens having a convex face directed to the object side is disposed.

Where the positive lens whose convex face is directed to the object side is disposed as the lens of the third lens group which is positioned most on the object side, reduction of the overall lens length can be achieved.

Or, a negative lens may be disposed on the image side of the positive lens disposed most on the object side. Where the negative lens is disposed on the image side of the positive lens disposed most on the object side, a negative spherical aberration which occurs with the third lens group can be corrected favorably. Particularly if a lens surface of the third lens group which is positioned most on the object side is formed as an aspheric lens face, then even if the refracting power is high, a negative spherical aberration can be corrected favorably.

(d) The fourth lens group is formed from at least one negative lens.

Particularly if the fourth lens group is formed from a cemented lens of a negative lens and a positive lens, then further enhancement in performance can be anticipated.

(e) The fifth lens group is formed from at least one negative lens.

Particularly if the fifth lens group is formed from a cemented lens of a negative lens and a positive lens, then further enhancement in performance can be anticipated.

(f) The sixth lens group is formed from a positive lens having a convex face directed to the object side and a negative lens having a convex face directed to the image side, disposed in order from the object side.

Where the sixth lens group is formed in a doublet configuration including the positive lens whose convex face is directed to the object side and the negative lens whose convex face is directed to the image side, it is possible to correct an off-axis aberration and an on-axis aberration simultaneously and favorably correct variation of various aberrations which appear when the position of the image pickup object varies. It is to be noted that, where glass which exhibits a comparatively small amount of dispersion is used, the sixth lens group may be formed from a single lens.

(g) A glass material having a high anomalous dispersion is used as a material of the lenses of the first lens group.

Where a glass material having a high anomalous dispersion is used as the material of the lenses of the first lens group, appearance of a chromatic aberration can be suppressed favorably. Particularly if a glass material having a high anomalous dispersion is used as a material of the positive lens in the cemented lens from among the lenses which compose the first lens group, then a secondary dispersion which appears in a central portion of a screen image in the telephoto end state can be corrected favorably.

(h) An aspheric lens is used as a particular lens in the first to sixth lens groups.

Where an aspheric lens is used as a component lens, a higher optical performance can be implemented. Particularly if an aspheric lens is used for the second lens group, then variation of a comatic aberration by the angle of view which appears in the wide angle end state can be corrected favorably.

Further, if a plurality of aspheric faces are used in one optical system, then a high optical performance is achieved naturally.

(i) One lens group or some lens component of one lens group from among the first to sixth lens groups is configured for shifting movement in a direction substantially perpendicular to the optical axis to shift the image position.

Particularly if the third lens group is shifted in a direction perpendicular to the optical axis, then variation of aberrations decreases.

Further, if the lens group or the lens component which is to be shifted is combined with a detection system, a mathematical operation system or a driving system, then it is possible to cause the same to function as a variable focal length lens system which carries out correction of image shake caused by camera shake or the like which occurs upon shutter release.

In this instance, the detection system detects a shake angle and outputs camera shake information, and the mathematical operation system outputs lens position information necessary for correction of the camera shake based on the camera shake information. Then, the driving system provides a driving amount to the lens group or lens component to be shifted based on the lens position information.

It is to be noted that, if the fourth lens group is configured for shifting movement, then since it is fixed in the direction of the optical axis, the driving mechanism for the shifting driving can be formed in a simple form.

(j) In order to prevent appearance of moire stripes on the image side of the lens system, a low-pass filter is disposed or an infrared cut filter is disposed in response to the spectral sensitivity characteristic of the light receiving element.

Now, several variable focal length lens systems according to several embodiments of the present invention and numerical value examples wherein specific numerical values are applied in the embodiments are described with reference to the accompanying drawings and tables.

It is to be noted that several symbols used in the following description have such meanings and so forth as given just below.

"Face number" is the number of the ith face as counted from the object side; "Ri" the radius of curvature of the ith face toward the image side as counted from the object side; "Di" the on-axis face distance between the ith face and the i+1th face; "Ni" the refractive index of a material of a lens with regard to the d line (wavelength: 587.6 nm); and "νi" the Abbe number of the material of the lens at the d line. As regards the face number, "ASP" represents that the face is an aspheric face, and as regards the radius of curvature, "0" represents that the face is a flat face. Further, as regards the face distance, "(Di)" represents that the face distance is a variable distance, and as regards the face distance, "(Bf)" represents the back focus.

Where the sag amount is represented by "x," the paraxial curvature, which is a reciprocal to the radius of curvature, at a vertex of a lens by "c," the height in a direction perpendicular to the optical axis by "y," a constant of the cone by "κ," and aspheric coefficients are represented by "A, B, . . . ," the aspheric face shape is defined by the following expression:

$$x = cy^2/[1+\{1-(1+\kappa)c^2y^2\}^{1/2}] + Ay^4 + By^6 + \ldots$$

FIG. 1 illustrates a refracting power distribution of a variable focal length lens system according to several embodiments of the present invention. Referring to FIG. 1, the variable focal length lens system in the embodiments includes a first lens group G1 having a positive refracting power, a second lens group G2 having a negative refracting power, a third lens group G3 having a positive refracting power, a fourth lens group G4 having a negative refracting power, a fifth lens group G5 having a negative refracting power, and a sixth lens group G6 having a positive refracting power, disposed in order from the object side.

In the embodiments, upon power variation from the wide angle end state to the telephoto end state, the distance between the first and second lens groups G1 and G2 increases; the distance between the second and third lens groups G2 and G3 decreases; the distance between the third and fourth lens groups G3 and G4 increases; the distance between the fourth and fifth lens groups G4 and G5 decreases; and the distance between the fifth and sixth lens groups G5 and G6 varies. At this time, the first lens group G1 first moves to the image side once and then moves to the object side, the second lens group G2 moves to the image side, and the third and fifth lens groups G3 and G5 move integrally with each other to the object side. The fourth lens group G4 is fixed in the direction of the optical axis, and the sixth lens group G6 moves once to the object side and then moves to the image side. The sixth lens group G6 moves so as to correct variation of the image surface position caused by the movement of the lens groups and moves, upon near distance focusing, to the image side.

Figure 2:
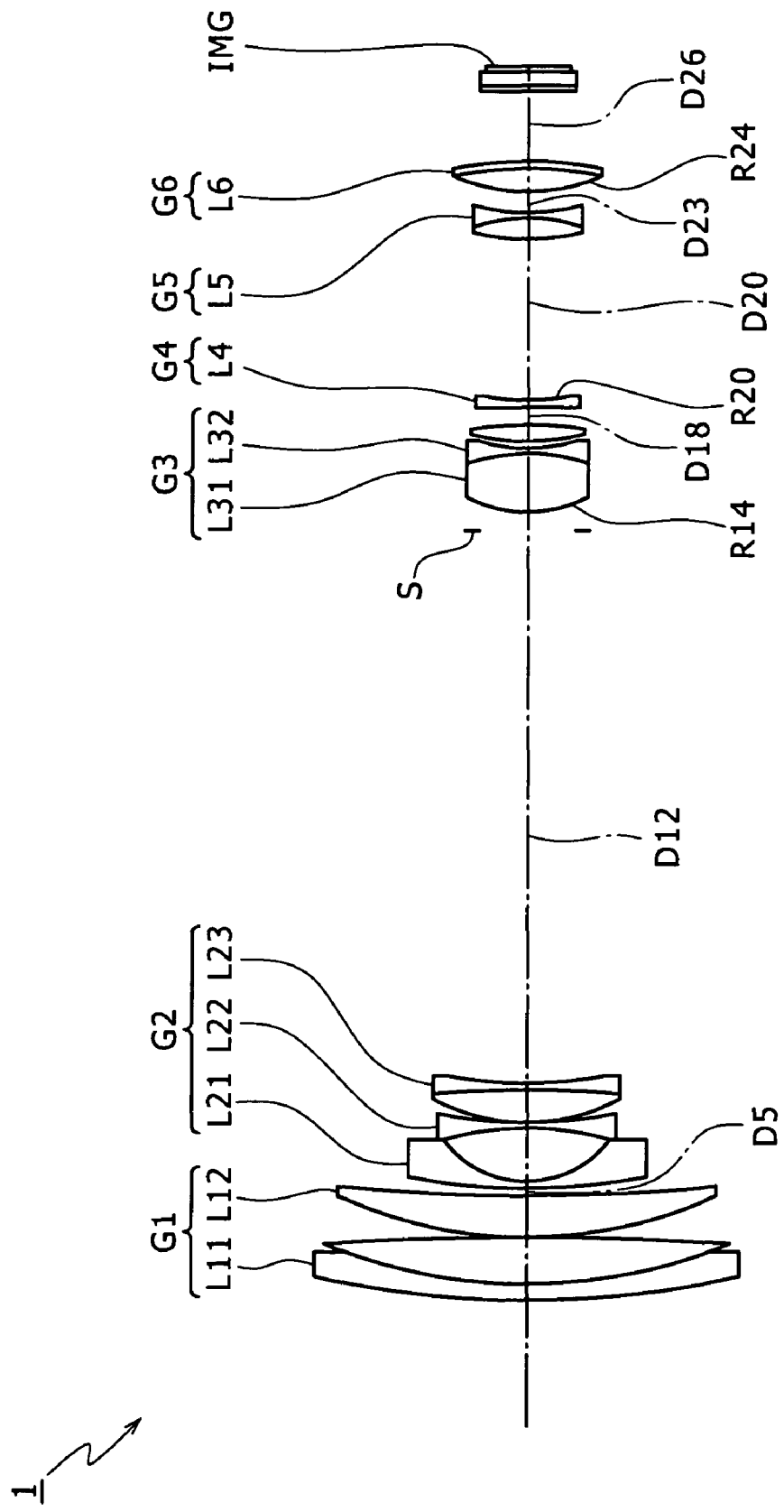
FIG. 2 is a schematic view showing a lens configuration of a variable focal length lens system according to a first embodiment of the present invention.

FIG. 2 shows a lens configuration of a variable focal length lens system 1 according to a first embodiment of the present invention. Referring to FIG. 2, the variable focal length lens system 1 includes 15 lenses.

The first lens group G1 includes a cemented lens L11 of a negative lens of a meniscus shape having a convex face directed to the object side and a positive lens having a convex face directed to the object side, and a positive lens L12 having a convex face directed to the object side.

The second lens group G2 includes a negative lens L21 of a meniscus shape having a concave face directed to the image side, a negative lens L22 of a biconcave shape, and a cemented lens L23 of a positive lens of a biconvex shape and a negative lens of a biconcave shape.

The third lens group G3 includes a cemented lens L31 of a positive lens of a biconvex shape and a negative lens of a biconcave shape, and a positive lens L32 of a biconvex shape.

The fourth lens group G4 includes a negative lens L4 having a concave face directed to the image side.

The fifth lens group G5 includes a cemented lens L5 of a positive lens of a biconvex shape and a negative lens of a biconcave shape.

The sixth lens group G6 includes a cemented lens L6 of a positive lens of a biconvex shape and a negative lens of a meniscus shape having a concave face directed to the object side.

An aperture stop S is disposed on the object side of the third lens group G3 for integral movement with the third lens group G3.

Table 1 indicates lens data of a numerical value example 1 wherein particular numerical values are applied to the variable focal length lens system 1 of the first embodiment together with the F number FNo and the angle 2ω of view in the wide angle end state wherein the focal length f is f=1.000, a first intermediate focal length state wherein the focal length f is f=3.645, a second intermediate focal length state wherein the focal length f is f=12.489, and the telephoto end state wherein the focal length f is f=28.135.

TABLE 1

| f | 1.000~3.645~12.489~28.135 |
|---|---|
| FNO | 2.87~3.31~3.67~4.56 |
| 2ω | 76.72~22.89~6.94~3.03 |

| Face number | Radius of curvature (Ri) | Face distance (Di) | Refractive index (Ni) | Abbe number (vi) |
|---|---|---|---|---|
| 1 | 18.12502 | 0.271 | 1.90366 | 31.1 |
| 2 | 9.48608 | 0.951 | 1.49700 | 81.6 |
| 3 | −51.73261 | 0.039 | | |
| 4 | 8.48093 | 0.684 | 1.60300 | 65.5 |
| 5 | 32.60152 | (D5) | | |
| 6 | 11.54790 | 0.136 | 1.88300 | 40.8 |
| 7 | 1.86177 | 1.024 | | |
| 8 | −6.52876 | 0.116 | 1.81600 | 46.6 |
| 9 | 8.27779 | 0.019 | | |
| 10 | 3.64989 | 0.565 | 1.92286 | 20.8 |
| 11 | −160.52842 | 0.116 | 1.80400 | 46.6 |
| 12 | 8.33424 | (D12) | | |
| 13 (Aperture stop) | 0.00000 | 0.310 | | |
| 14 (ASP) | 2.53827 | 1.129 | 1.61800 | 63.4 |
| 15 | −3.52574 | 0.116 | 1.60342 | 38.0 |
| 16 | 2.55929 | 0.131 | | |
| 17 | 5.63272 | 0.291 | 1.80400 | 46.6 |
| 18 | −6.91459 | (D18) | | |
| 19 | 17.88623 | 0.116 | 1.60300 | 65.5 |
| 20 (ASP) | 4.07660 | (D20) | | |
| 21 | 3.87454 | 0.423 | 1.60300 | 65.5 |
| 22 | −2.76958 | 0.097 | 1.70154 | 41.2 |
| 23 | 4.21801 | (D23) | | |
| 24 (ASP) | 3.46585 | 0.387 | 1.60300 | 65.5 |
| 25 | −6.75613 | 0.107 | 1.92286 | 20.8 |
| 26 | −8.05212 | (D26) | | |
| 27 | INFINITY | 0.277 | 1.51680 | 64.2 |
| 28 | INFINITY | (Bf) | | |

In the variable focal length lens system 1, the face of the cemented lens L31 of the third lens group G3 on the object side, that is, the face of the face number 14, the face of the negative lens L4 of the fourth lens group G4 on the image side, that is, the face of the face number 20 and the face of the cemented lens L6 of the sixth lens group G6 on the object side, that is, the face of the face number 24, are formed as aspheric faces.

The fourth-, sixth-, eighth-, and tenth-order aspheric coefficients A, B, C, and D of the aspheric faces in the numerical value example 1 are indicated in Table 2 together with the constant "κ" of the cone.

It is to be noted that, in Table 2 and another table hereinafter given which indicates the aspheric face coefficient, "E-i" is an exponential representation whose base is 10, that is, "$10^{-i}$", and for example, "0.12345E-05" represents "$0.12345 \times 10^{-5}$."

TABLE 2

| 14th face | κ = 1.247762 | A = −0.161161E−01 | B = −0.322767E−02 | C = −0.119053E−03 | D = −0.437029E−03 |
|---|---|---|---|---|---|
| 20th face | κ = 0.000000 | A = +0.112379E−02 | B = −0.131950E−02 | C = +0.233181E−03 | D = 0 |
| 24th face | κ = −0.481032 | A = −0.338238E−02 | B = +0.530431E−02 | C = −0.506693E−02 | D = +0.165546E−02 |

The variation distance when the lens position state varies in the numerical value example 1 is indicated in Table 3.

TABLE 3

| f | 1.000 | 3.645 | 12.489 | 28.135 |
|---|---|---|---|---|
| D5 | 0.145 | 5.116 | 8.744 | 10.136 |
| D12 | 10.439 | 3.854 | 0.913 | 0.387 |
| D18 | 0.291 | 1.739 | 2.826 | 3.188 |
| D20 | 3.091 | 1.643 | 0.556 | 0.194 |
| D23 | 0.349 | 0.838 | 1.510 | 3.410 |
| D26 | 1.404 | 2.181 | 3.411 | 1.479 |
| Bf | 0.134 | 0.134 | 0.134 | 0.134 |

Corresponding values of the conditional expressions (1) to (7) in the numerical value example 1 are indicated in Table 4.

TABLE 4

| | γmax = 0.752 |
|---|---|
| | β2W = −0.179 |
| | β2t = −1.594 |
| | f14w = 1.678 |
| | f12t = −22.956 |
| Conditional expression (1) | f14w/fw = 1.678 |
| Conditional expression (2) | β2w = −0.179 |
| Conditional expression (3) | β2t = −1.594 |
| Conditional expression (4) | TLt/ft = 0.932 |
| Conditional expression (5) | TLw/TLt = 0.883 |
| Conditional expression (6) | βfw/γmax = 2.285 |
| Conditional expression (7) | |f12t|/ft = 0.816 |

As apparent from Table 4, the variable focal length lens system 1 is configured so as to satisfy the conditional expressions (1) to (7).

Figure 3:
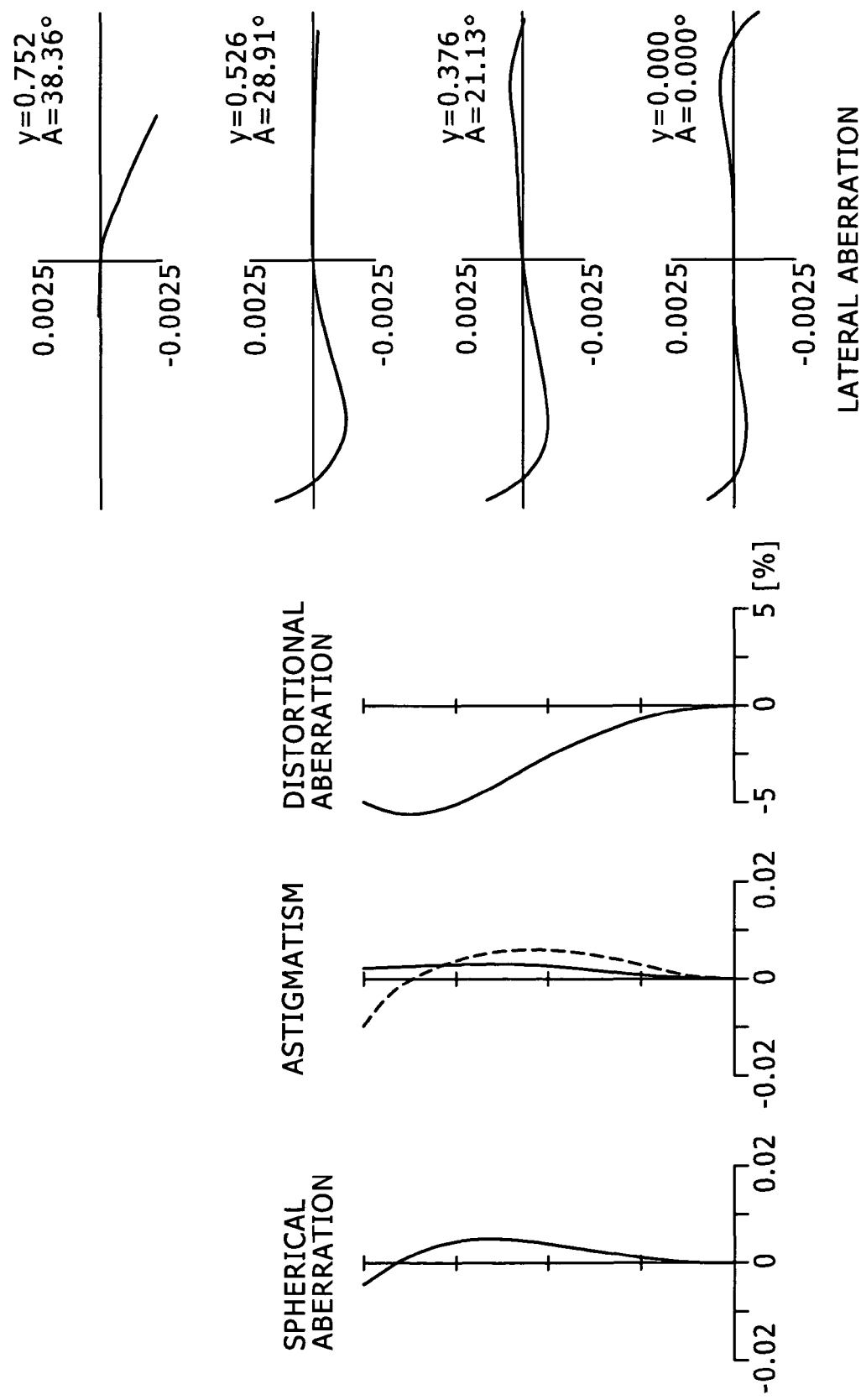
FIG. 3 is a diagrammatic view illustrating a spherical aberration, an astigmatism, a distortional aberration, and lateral aberrations in a wide angle end state of the variable focal length lens system of FIG. 2 according to a numerical value example wherein particular numerical values are applied to the variable focal length lens system.
Figure 4:
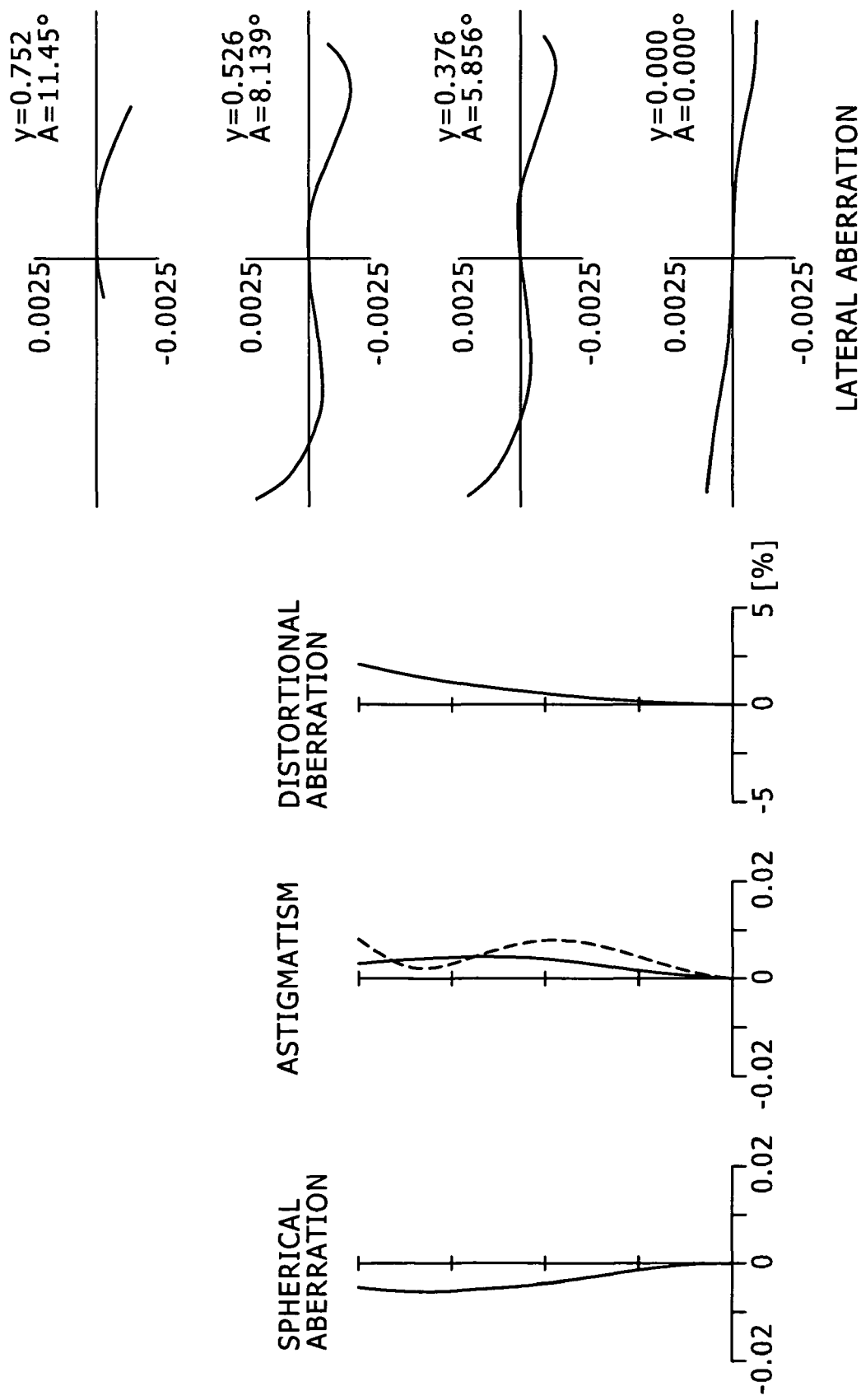
FIG. 4 is a similar view but illustrating a spherical aberration, an astigmatism, a distortional aberration, and lateral aberrations in a first intermediate focal length state of the variable focal length lens system of FIG. 2.
Figure 5:
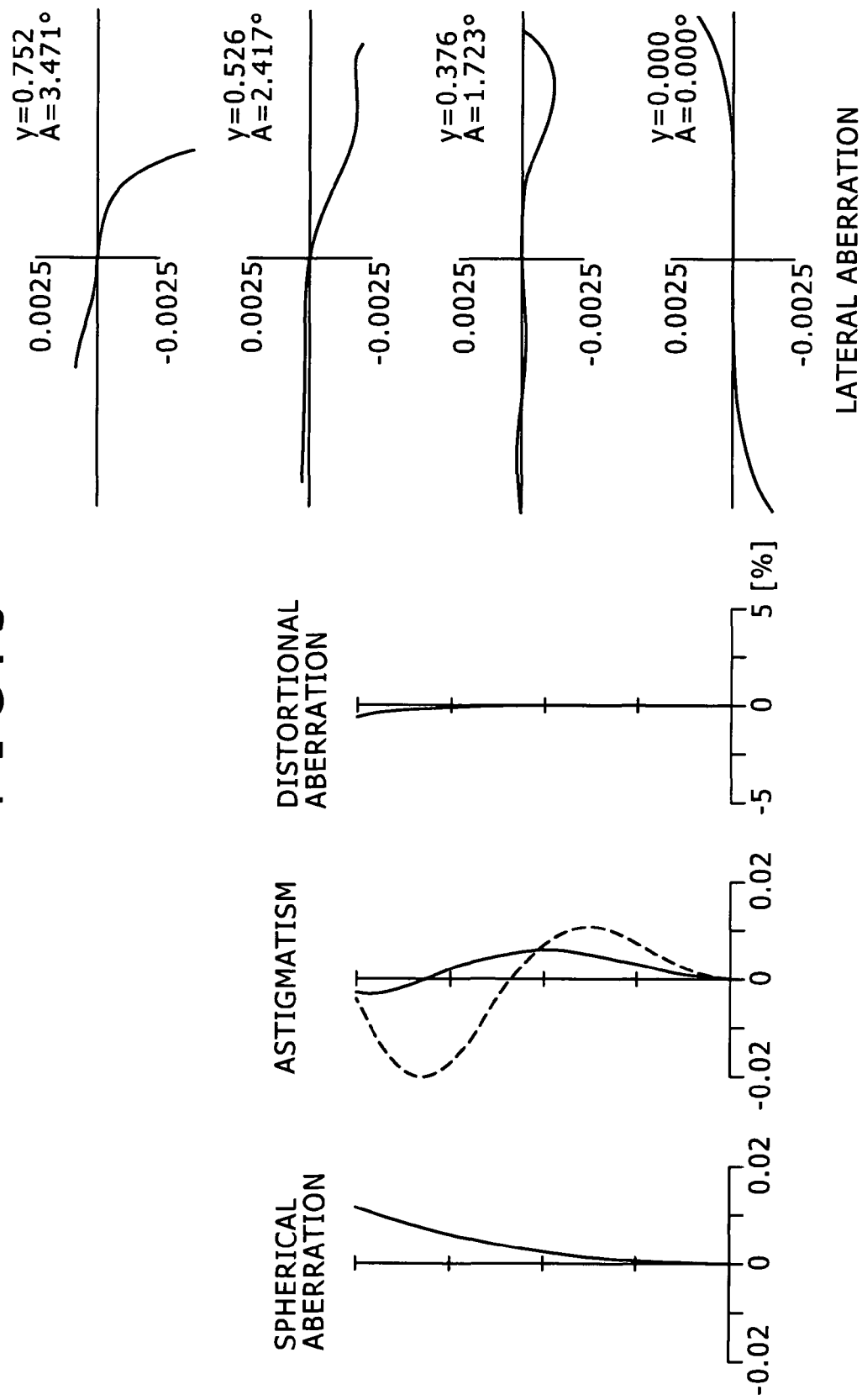
FIG. 5 is a similar view but illustrating a spherical aberration, an astigmatism, a distortional aberration, and lateral aberrations in a second intermediate focal length state of the variable focal length lens system of FIG. 2.
Figure 6:
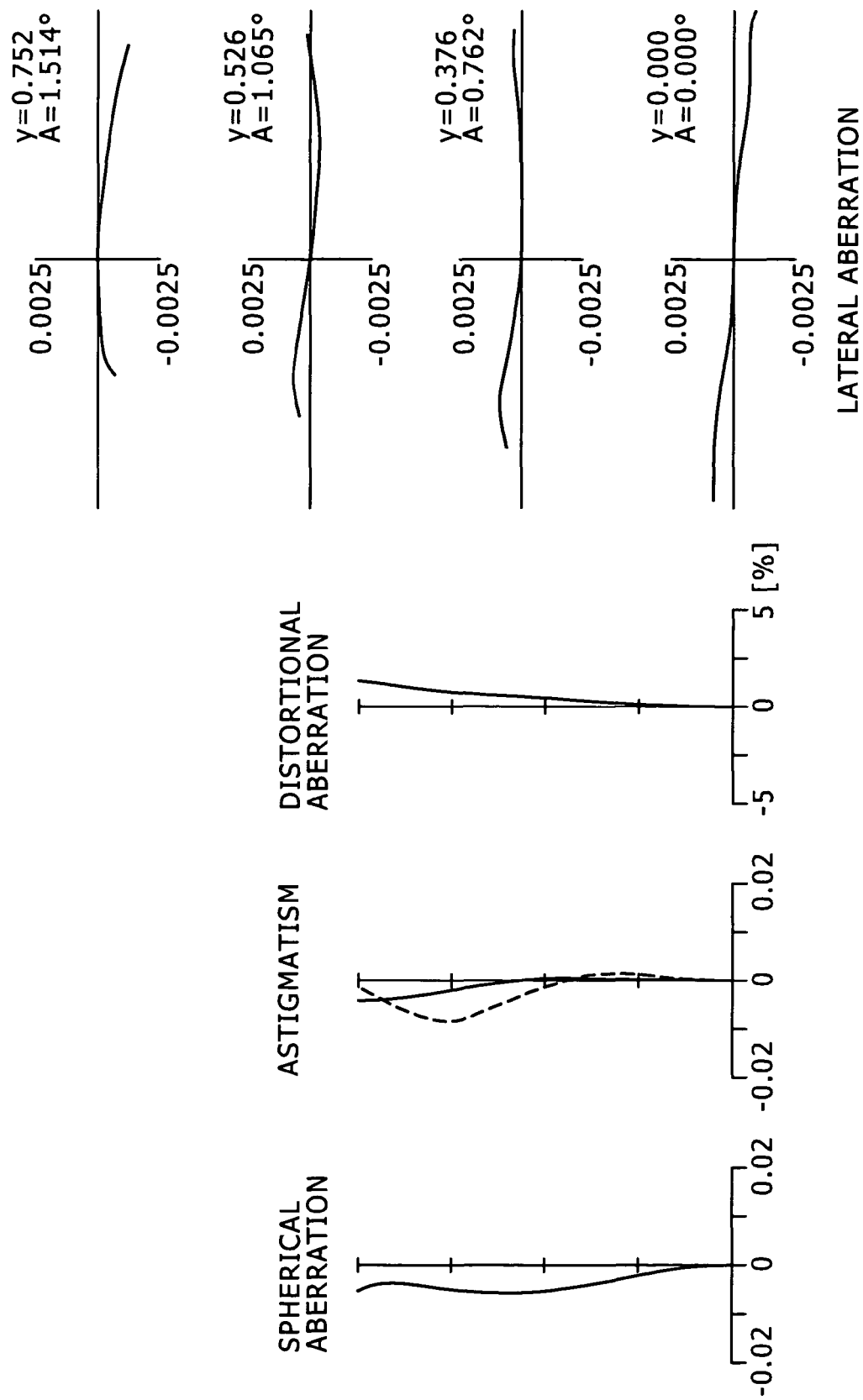
FIG. 6 is a similar view but illustrating a spherical aberration, an astigmatism, a distortional aberration, and lateral aberrations in a telephoto end state of the variable focal length lens system of FIG. 2.

Various aberrations in an infinitely remotely focused state in the numerical value example 1 are illustrated in FIGS. 3 to 6. FIG. 3 illustrates the aberrations in the wide angle end state wherein the focal length f is f=1.000, FIG. 4 the aberrations in a first intermediate focal length state wherein the focal length f is f=3.645, FIG. 5 the aberrations in a second intermediate focal length state wherein the focal length f is f=12.489, and FIG. 6 the aberrations in the telephoto end state wherein the focal length f is f=28.135.

In the views of FIGS. 3 to 6, a solid line curve and a broken line curve of the astigmatism indicate values on the sagittal image plane and the meridional image plane, respectively. In the graphs representing the lateral aberration, y indicates the image height and A the angle of view.

From the graphs of the aberrations, it is apparent that, in the numerical value example 1, the aberrations are corrected favorably and a superior image formation performance is exhibited.

Figure 7:
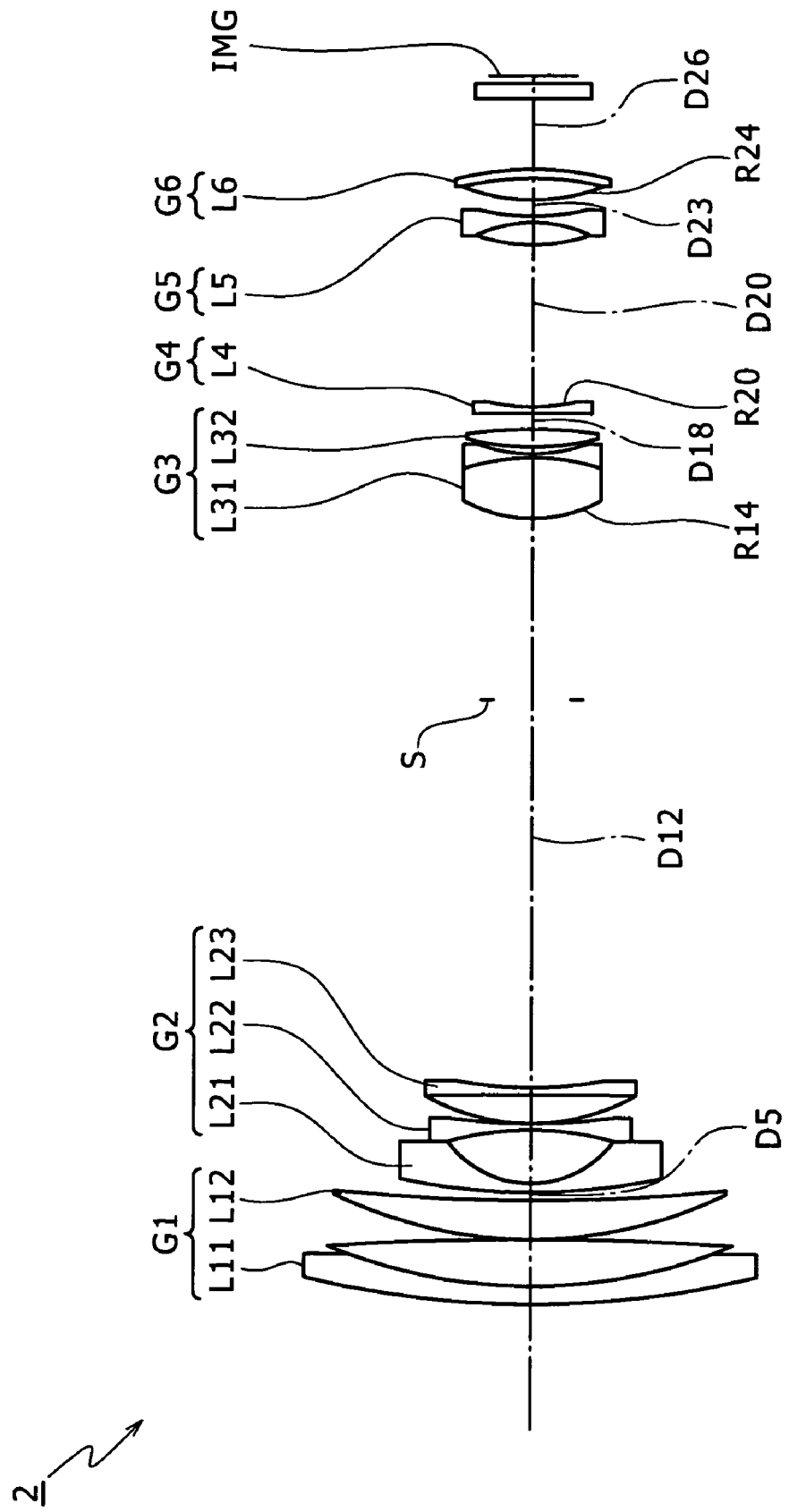
FIG. 7 is a schematic view showing a lens configuration of a variable focal length lens system according to a second embodiment of the present invention.

FIG. 7 shows a lens configuration of a variable focal length lens system 2 according to a second embodiment of the present invention. Referring to FIG. 7, the variable focal length lens system 2 shown includes 15 lenses.

The first lens group G1 includes a cemented lens L11 of a negative lens of a meniscus shape having a convex face directed to the object side and a positive lens having a convex face directed to the object side, and a positive lens L12 having a convex face directed to the object side.

The second lens group G2 includes a negative lens L21 of a meniscus shape having a concave face directed to the image side, a negative lens L22 of a biconcave shape, and a cemented lens L23 of a positive lens of a biconvex shape and a negative lens of a biconcave shape.

The third lens group G3 includes a cemented lens L31 of a positive lens of a biconvex shape and a negative lens of a biconcave shape, and a positive lens L32 of a biconvex shape.

The fourth lens group G4 includes a negative lens L4 having a concave face directed to the image side.

The fifth lens group G5 includes a cemented lens L5 of a positive lens of a biconvex shape and a negative lens of a biconcave shape.

The sixth lens group G6 includes a cemented lens L6 of a positive lens of a biconvex shape and a negative lens of a meniscus shape having a concave face directed to the object side.

An aperture stop S is disposed on the object side of the third lens group G3 and fixed in the direction of the optical axis irrespective of the lens position state.

Table 5 indicates lens data of a numerical value example 2 wherein particular numerical values are applied to the variable focal length lens system 2 of the second embodiment together with the F number FNo and the angle 2ω of view in the wide angle end state wherein the focal length f is f=1.000, a first intermediate focal length state wherein the focal length f is f=3.645, a second intermediate focal length state wherein the focal length f is f=12.489 and the telephoto end state wherein the focal length f is f=28.135.

TABLE 5

| f | 1.000~3.645~12.489~28.135 | | |
|---|---|---|---|
| FNO | 2.87~3.31~4.32~5.54 | | |
| 2ω | 76.87~22.89~6.94~3.03 | | |

| Face number | Radius of curvature (Ri) | Face distance (Di) | Refractive index (Ni) | Abbe number (vi) |
|---|---|---|---|---|
| 1 | 18.12502 | 0.271 | 1.90366 | 31.1 |
| 2 | 9.48608 | 0.951 | 1.49700 | 81.6 |

TABLE 5-continued

| Face number | Radius of curvature (Ri) | Face distance (Di) | Refractive index (Ni) | Abbe number (vi) |
|---|---|---|---|---|
| 3 | −51.73261 | 0.039 | | |
| 4 | 8.48093 | 0.684 | 1.60300 | 65.5 |
| 5 | 32.60152 | (D5) | | |
| 6 | 11.54790 | 0.136 | 1.88300 | 40.8 |
| 7 | 1.86177 | 1.024 | | |
| 8 | −6.52876 | 0.116 | 1.81600 | 46.6 |
| 9 | 8.27779 | 0.019 | | |
| 10 | 3.64989 | 0.565 | 1.92286 | 20.8 |
| 11 | −160.52842 | 0.116 | 1.80400 | 46.6 |
| 12 | 8.33424 | (D12) | | |
| 13 (Aperture stop) | 0.00000 | (D13) | | |
| 14 (ASP) | 2.53827 | 1.129 | 1.61800 | 63.4 |
| 15 | −3.52574 | 0.116 | 1.60342 | 38.0 |
| 16 | 2.55929 | 0.131 | | |
| 17 | 5.63272 | 0.291 | 1.80400 | 46.6 |
| 18 | −6.91459 | (D18) | | |
| 19 | 17.88623 | 0.116 | 1.60300 | 65.5 |
| 20 (ASP) | 4.07660 | (D20) | | |
| 21 | 3.87454 | 0.423 | 1.60300 | 65.5 |
| 22 | −2.76958 | 0.097 | 1.70154 | 41.2 |
| 23 | 4.21801 | (D23) | | |
| 24 (ASP) | 3.46585 | 0.387 | 1.60300 | 65.5 |
| 25 | −6.75613 | 0.107 | 1.92286 | 20.8 |
| 26 | −8.05212 | (D26) | | |
| 27 | INFINITY | 0.277 | 1.51680 | 64.2 |
| 28 | INFINITY | (Bf) | | |

In the variable focal length lens system 2, the face of the cemented lens L31 of the third lens group G3 on the object side, that is, the face of the face number 14, the face of the negative lens L4 of the fourth lens group G4 on the image side, that is, the face of the face number 20 and the face of the cemented lens L6 of the sixth lens group G6 on the object side, that is, the face of the face number 24, are formed as aspheric faces.

The fourth-, sixth-, eighth-, and tenth-order aspheric coefficients A, B, C, and D of the aspheric faces in the numerical value example 2 are indicated in Table 6 together with the constant "κ" of the cone.

TABLE 6

| 14th face | κ = 1.247762 | A = −0.161161E−01 | B = −0.322767E−02 | C = −0.119053E−03 | D = −0.437029E−03 |
| 20th face | κ = 0.000000 | A = +0.112379E−02 | B = −0.131950E−02 | C = +0.233181E−03 | D = 0 |
| 24th face | κ = −0.481032 | A = −0.338238E−02 | B = +0.530431E−02 | C = −0.506693E−02 | D = +0.165546E−02 |

The variation distance when the lens position state varies in the numerical value example 2 is indicated in Table 7.

TABLE 7

| f | 1.000 | 3.645 | 12.489 | 28.135 |
|---|---|---|---|---|
| D5 | 0.145 | 5.116 | 8.744 | 10.136 |
| D12 | 7.303 | 1.985 | 0.945 | 0.387 |
| D13 | 3.446 | 2.179 | 0.278 | 0.310 |
| D18 | 0.291 | 1.739 | 2.826 | 3.188 |
| D20 | 3.091 | 1.643 | 0.556 | 0.194 |
| D23 | 0.349 | 0.838 | 1.510 | 3.410 |
| D26 | 1.404 | 2.181 | 3.411 | 1.479 |
| Bf | 0.134 | 0.134 | 0.134 | 0.134 |

Corresponding values of the conditional expressions (1) to (7) in the numerical value example 2 are indicated in Table 8.

TABLE 8

|  |  |
|---|---|
|  | γmax = 0.752 |
|  | β2W = −0.179 |
|  | β2t = −1.594 |
|  | f14w = 1.678 |
|  | f12t = −22.956 |
| Conditional expression (1) | f14w/fw = 1.678 |
| Conditional expression (2) | β2w = −0.179 |
| Conditional expression (3) | β2t = −1.594 |
| Conditional expression (4) | TLt/ft = 0.932 |
| Conditional expression (5) | TLw/TLt = 0.883 |
| Conditional expression (6) | Bfw/γmax = 2.285 |
| Conditional expression (7) | |f12t|/ft = 0.816 |

As apparent from Table 8, the variable focal length lens system 2 is configured so as to satisfy the conditional expressions (1) to (7).

Figure 8:
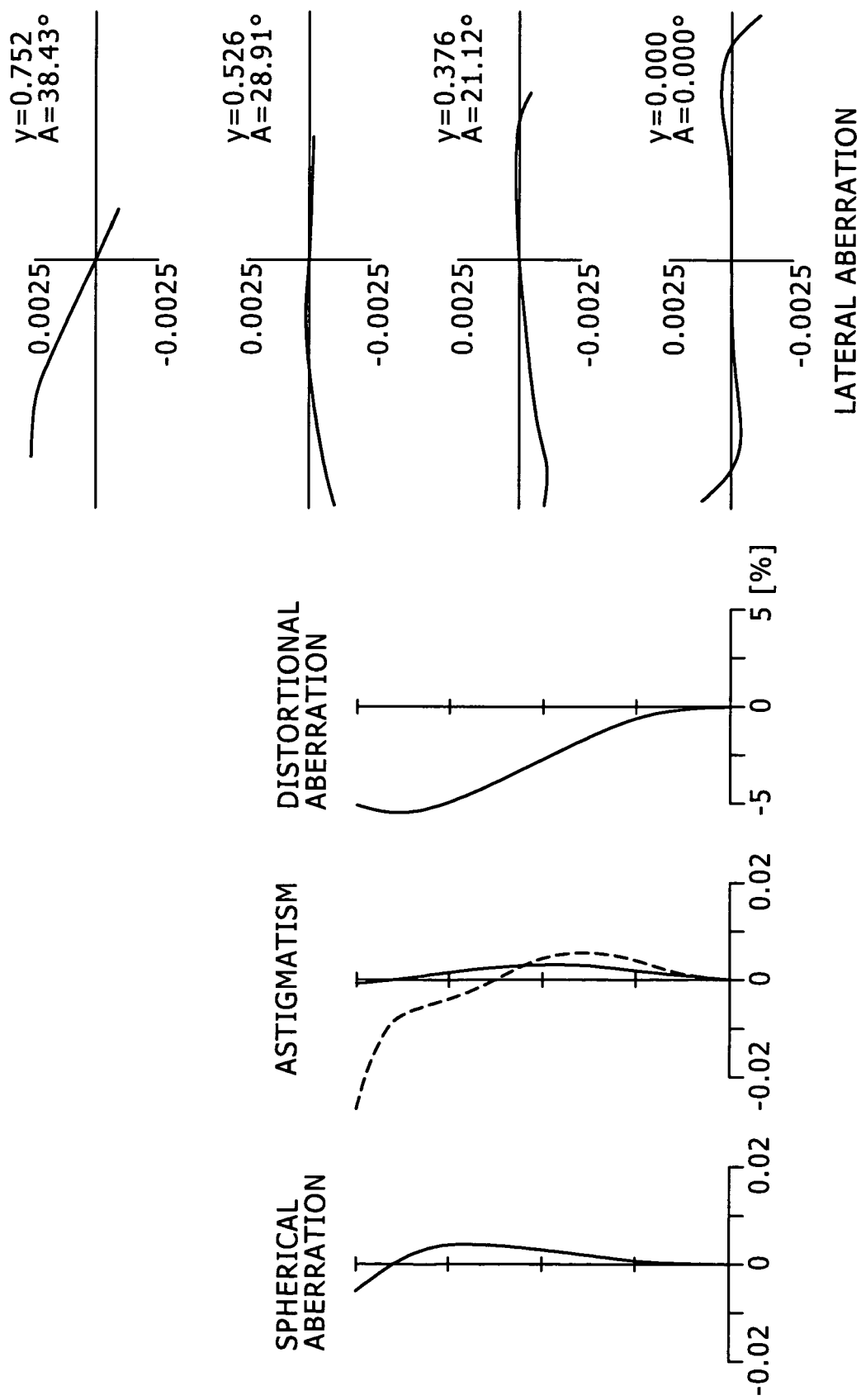
FIG. 8 is a diagrammatic view illustrating a spherical aberration, an astigmatism, a distortional aberration, and lateral aberrations in a wide angle end state of the variable focal length lens system of FIG. 7 according to a numerical value example wherein particular numerical values are applied to the variable focal length lens system.
Figure 9:
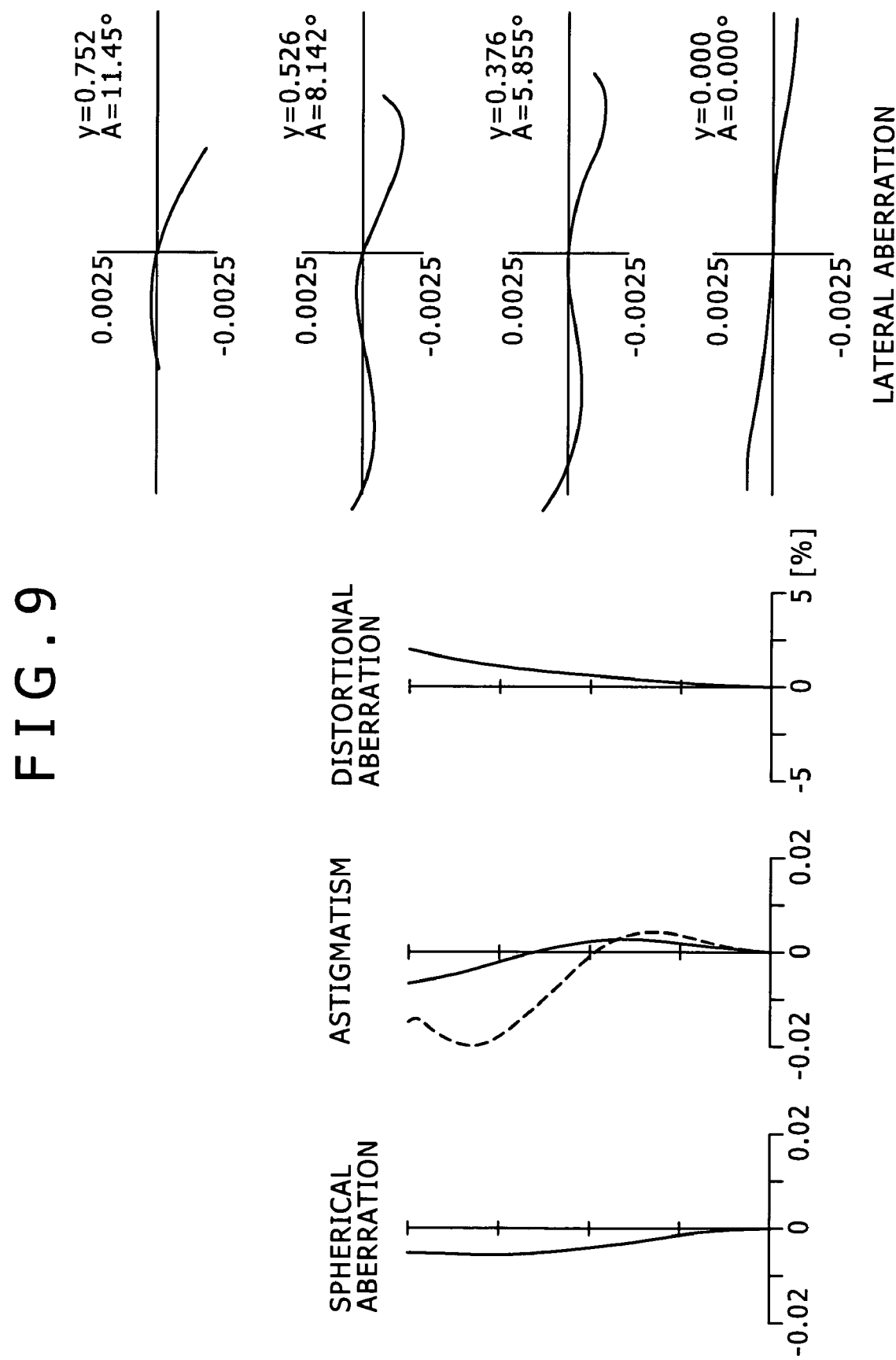
FIG. 9 is a similar view but illustrating a spherical aberration, an astigmatism, a distortional aberration, and lateral aberrations in a first intermediate focal length state of the variable focal length lens system of FIG. 7.
Figure 10:
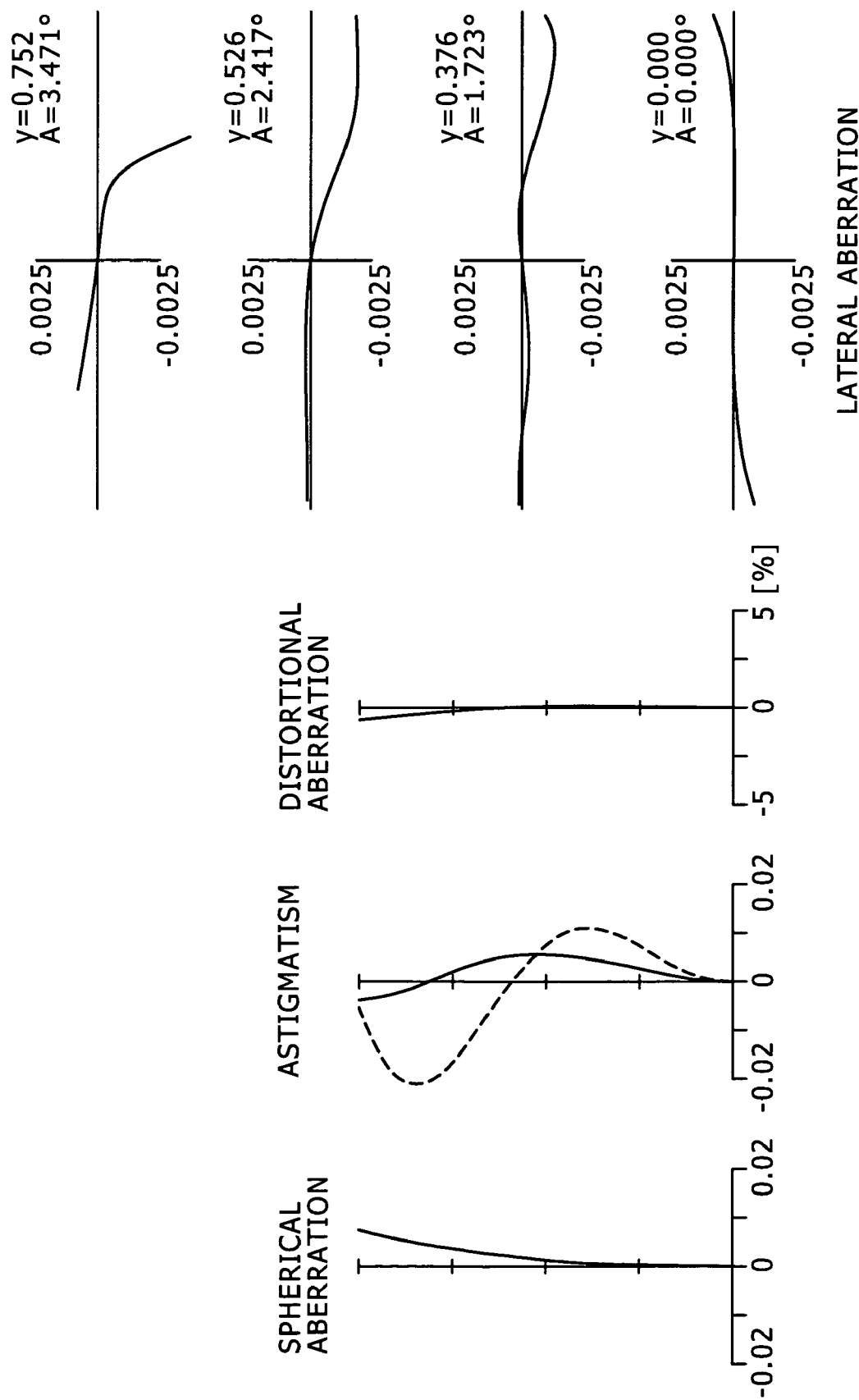
FIG. 10 is a similar view but illustrating a spherical aberration, an astigmatism, a distortional aberration, and lateral aberrations in a second intermediate focal length state of the variable focal length lens system of FIG. 7.
Figure 11:
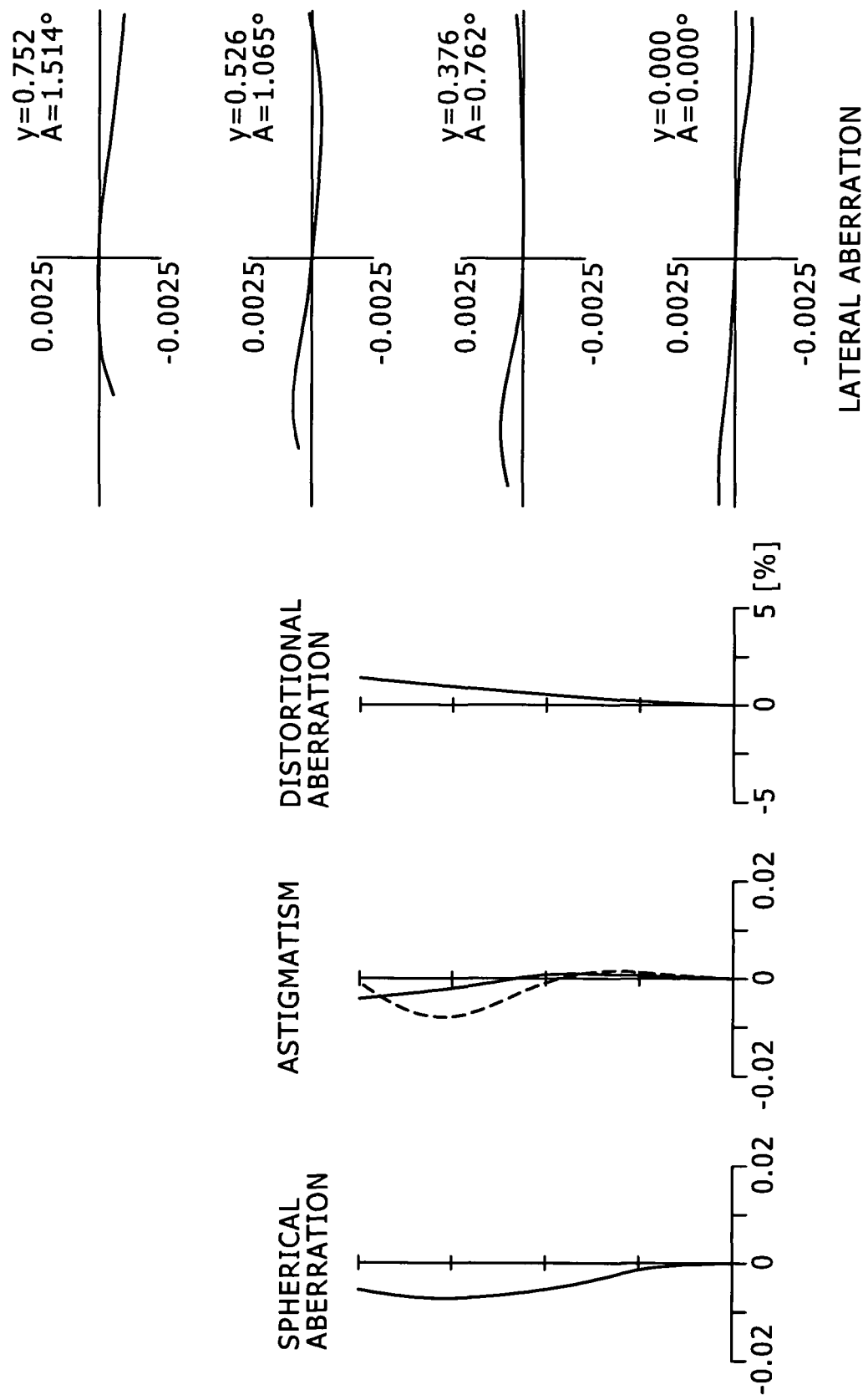
FIG. 11 is a similar view but illustrating a spherical aberration, an astigmatism, a distortional aberration, and lateral aberrations in a telephoto end state of the variable focal length lens system of FIG. 7.

Various aberrations in an infinitely remotely focused state in the numerical value example 2 are illustrated in FIGS. 8 to 11. FIG. 8 illustrates the aberrations in the wide angle end state wherein the focal length f is f=1.000, FIG. 9 the aberrations in a first intermediate focal length state wherein the focal length f is f=3.645, FIG. 10 the aberrations in a second intermediate focal length state wherein the focal length f is f=12.489, and FIG. 11 the aberrations in the telephoto end state wherein the focal length f is f=28.135.

In the views of FIGS. 8 to 11, a solid line curve and a broken line curve of the astigmatism indicate values on the sagittal image plane and the meridional image plane, respectively. In the graphs representing the lateral aberration, y indicates the image height and A the angle of view.

From the graphs of the aberrations, it is apparent that, in the numerical value example 2, the aberrations are corrected favorably and a superior image formation performance is exhibited.

Figure 12:
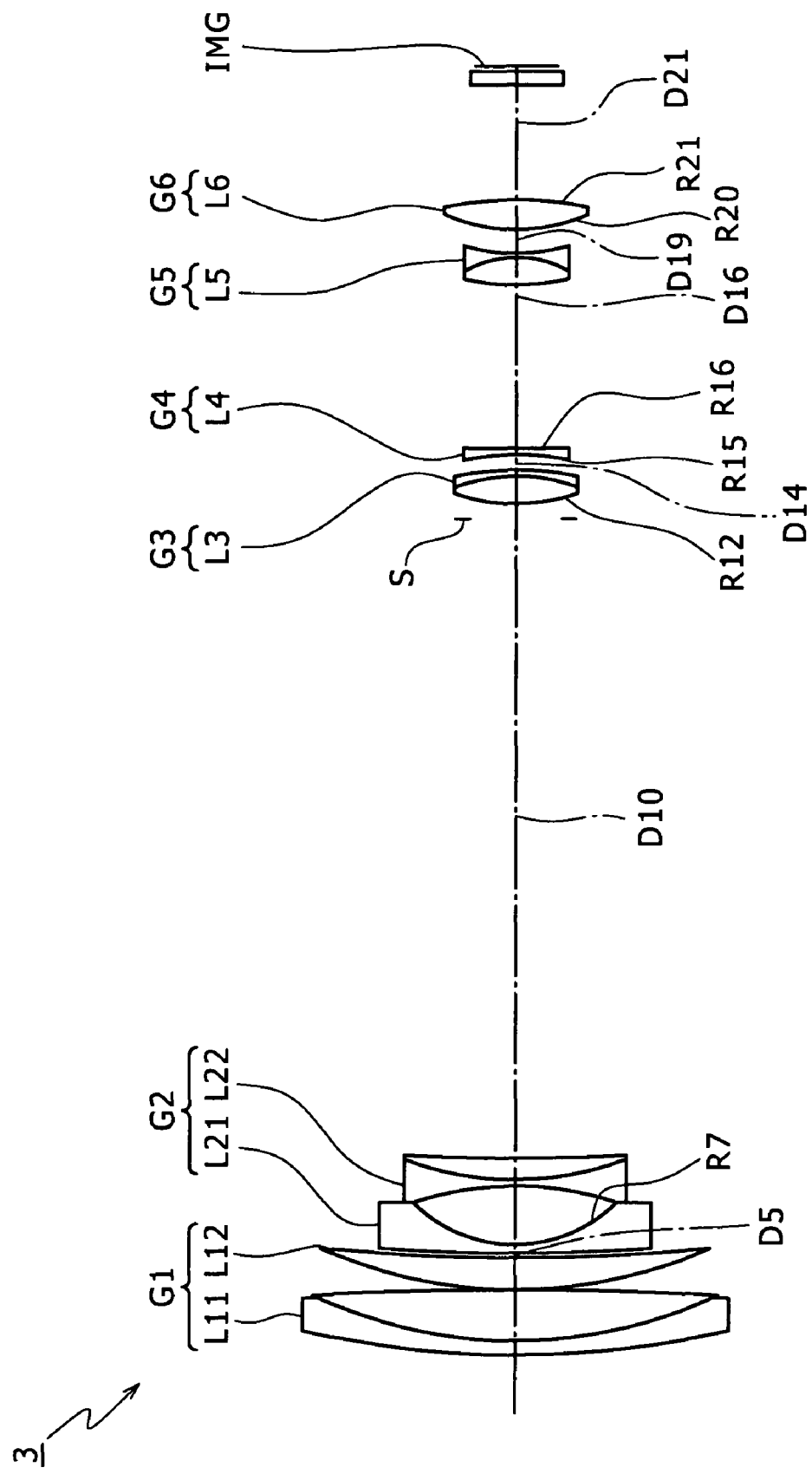
FIG. 12 is a schematic view showing a lens configuration of a variable focal length lens system according to a third embodiment of the present invention.

FIG. 12 shows a lens configuration of a variable focal length lens system 3 according to a third embodiment of the present invention. Referring to FIG. 12, the variable focal length lens system 3 shown includes 12 lenses.

The first lens group G1 includes a cemented lens L11 of a negative lens of a meniscus shape having a convex face directed to the object side and a positive lens having a convex face directed to the object side, and a positive lens L12 having a convex face directed to the object side.

The second lens group G2 includes a negative lens L21 of a meniscus shape having a concave face directed to the image side and a cemented lens L22 of a negative lens of a biconcave shape and a positive lens of a meniscus shape having a convex face directed to the object side.

The third lens group G3 includes a cemented lens L3 of a positive lens of a biconvex shape and a negative lens of a meniscus shape having a concave face directed to the object side.

The fourth lens group G4 includes a negative lens L4 having a concave face directed to the image side.

The fifth lens group G5 includes a cemented lens L5 of a positive lens of a biconvex shape and a negative lens of a biconcave shape.

The sixth lens group G6 includes a cemented lens L6 of a biconvex shape.

An aperture stop S is disposed on the object side of the third lens group G3 and moves integrally with the third lens group G3.

Table 9 indicates lens data of a numerical value example 3 wherein particular numerical values are applied to the variable focal length lens system 3 of the third embodiment together with the F number FNo and the angle 2ω of view in the wide angle end state wherein the focal length f is f=1.000, a first intermediate focal length state wherein the focal length f is f=4.282, a second intermediate focal length state wherein the focal length f is f=12.640 and the telephoto end state wherein the focal length f is f=28.155.

TABLE 9

| | f | 1.000~4.282~12.640~28.155 | | |
|---|---|---|---|---|
| | FNO | 2.88~3.24~3.31~4.37 | | |
| | 2ω | 79.37~20.54~7.21~3.19 | | |
| Face number | Radius of curvature (Ri) | Face distance (Di) | Refractive index (Ni) | Abbe number (vi) |
| 1 | 17.4618 | 0.284 | 1.90366 | 31.1 |
| 2 | 10.0633 | 0.916 | 1.49700 | 81.6 |
| 3 | −84.0460 | 0.041 | | |
| 4 | 9.1080 | 0.616 | 1.60300 | 65.5 |
| 5 | 26.3382 | (D5) | | |
| 6 | 34.0586 | 0.142 | 1.88300 | 40.8 |
| 7 (ASP) | 2.7698 | 1.060 | | |
| 8 | −7.0207 | 0.122 | 1.72000 | 50.2 |
| 9 | 5.3280 | 0.441 | 1.94595 | 18.0 |
| 10 | 22.4923 | (D10) | | |
| 11 (Aparture stop) | 0.0000 | 0.223 | | |
| 12 (ASP) | 4.0624 | 0.520 | 1.69680 | 55.5 |
| 13 | −3.3355 | 0.122 | 1.68893 | 31.1 |
| 14 | −6.4994 | (D14) | | |
| 15 (ASP) | −4.2521 | 0.122 | 1.55332 | 71.7 |
| 16 (ASP) | 114.3704 | (D16) | | |
| 17 | 4.2638 | 0.550 | 1.60300 | 65.5 |
| 18 | −2.0317 | 0.102 | 1.72047 | 34.7 |
| 19 | 3.3746 | (D19) | | |
| 20 (ASP) | 3.4342 | 0.594 | 1.61800 | 63.4 |
| 21 (ASP) | −4.9943 | (D21) | | |
| 22 | 0.0000 | 0.189 | 1.51680 | 64.2 |
| 23 | 0.0000 | (Bf) | | |

In the variable focal length lens system 3, a face of the negative lens L21 of the second lens group G2 on the image side, that is, the face of the face number 7, a face of the cemented lens L3 of the third lens group G3 on the object side, that is, the face of the face number 12, a face of the negative lens L4 of the fourth lens group G4 on the object side, that is, the face of the face number 15, a face of the negative lens L4 of the fourth lens group G4 on the image side, that is, the face of the face number 16, a face of the positive lens L6 of the sixth lens group G6 on the object side, that is, the face of the face number 20, and a face of the positive lens L6 of the sixth lens group G6 on the image side, that is, the face of the face number 21 are formed as aspheric faces.

The fourth-, sixth-, eighth-, and tenth-order aspheric coefficients A, B, C, and D of the aspheric faces in the numerical value example 3 are indicated in Table 10 together with the constant "κ" of the cone.

TABLE 10

| 7th face | κ = 0.000000 | A = −0.264044E−02 | B = −0.324761E−03 | C = 0.693382E−04 | D = −0.180907E−04 |
|---|---|---|---|---|---|
| 12th face | κ = 0.629828 | A = −0.637542E−02 | B = 0.533983E−03 | C = −0.718124E−03 | D = 0.271215E−03 |
| 15th face | κ = 0.000000 | A = 0.419647E−01 | B = −0.198669E−01 | C = 0.000000E+00 | D = 0.000000E+00 |

TABLE 10-continued

| | | | | |
|---|---|---|---|---|
| 16th face | κ = 0.000000 | A = 0.347302E−01 | B = −0.181321E−01 | C = −0.177656E−02 | D = 0.000000E+00 |
| 20th face | κ = 1.978378 | A = −0.116973E−01 | B = −0.720726E−03 | C = −0.801913E−04 | D = −0.112751E−03 |
| 21st face | κ = 0.000000 | A = 0.245277E−02 | B = 0.209185E−03 | C = 0.000000E+00 | D = 0.000000E+00 |

The variation distance when the lens position state varies in the numerical value example 3 is indicated in Table 11.

TABLE 11

| f | 1.000 | 4.282 | 12.640 | 28.155 |
|---|---|---|---|---|
| D6 | 0.152 | 5.806 | 9.926 | 11.464 |
| D10 | 12.502 | 3.564 | 1.156 | 0.595 |
| D14 | 0.325 | 1.801 | 2.907 | 3.276 |
| D16 | 3.154 | 1.679 | 0.572 | 0.203 |
| D19 | 0.523 | 1.076 | 1.822 | 3.814 |
| D21 | 2.213 | 3.140 | 3.494 | 1.884 |
| Bf | 0.122 | 0.122 | 0.122 | 0.122 |

Corresponding values of the conditional expressions (1) to (7) in the numerical value example 3 are indicated in Table 12.

TABLE 12

| | |
|---|---|
| | γmax = 0.788 |
| | β2W = −0.182 |
| | β2t = −1.543 |
| | f14w = 1.914 |
| | f12t = −25.361 |
| Conditional expression (1) | f14w/fw = 1.914 |
| Conditional expression (2) | β2w = −0.182 |
| Conditional expression (3) | β2t = −1.543 |
| Conditional expression (4) | TLt/ft = 0.973 |
| Conditional expression (5) | TLw/TLt = 0.914 |
| Conditional expression (6) | Bfw/γmax = 3.121 |
| Conditional expression (7) | |f12t|/ft = 0.901 |

As apparent from Table 12, the variable focal length lens system 3 is configured so as to satisfy the conditional expressions (1) to (7).

Figure 13:
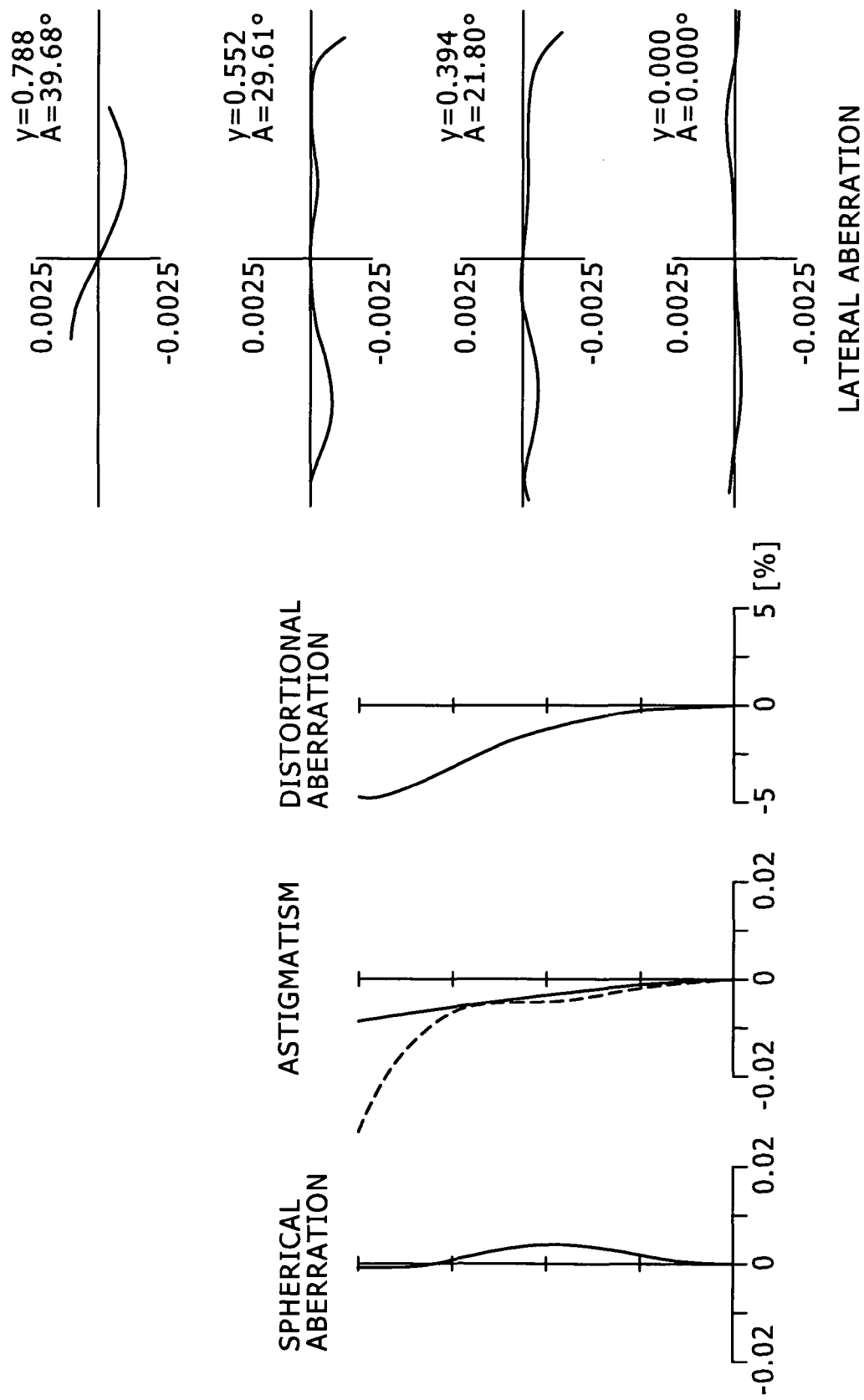
FIG. 13 is a diagrammatic view illustrating a spherical aberration, an astigmatism, a distortional aberration, and lateral aberrations in a wide angle end state of the variable focal length lens system of FIG. 12 according to a numerical value example wherein particular numerical values are applied to the variable focal length lens system.
Figure 14:
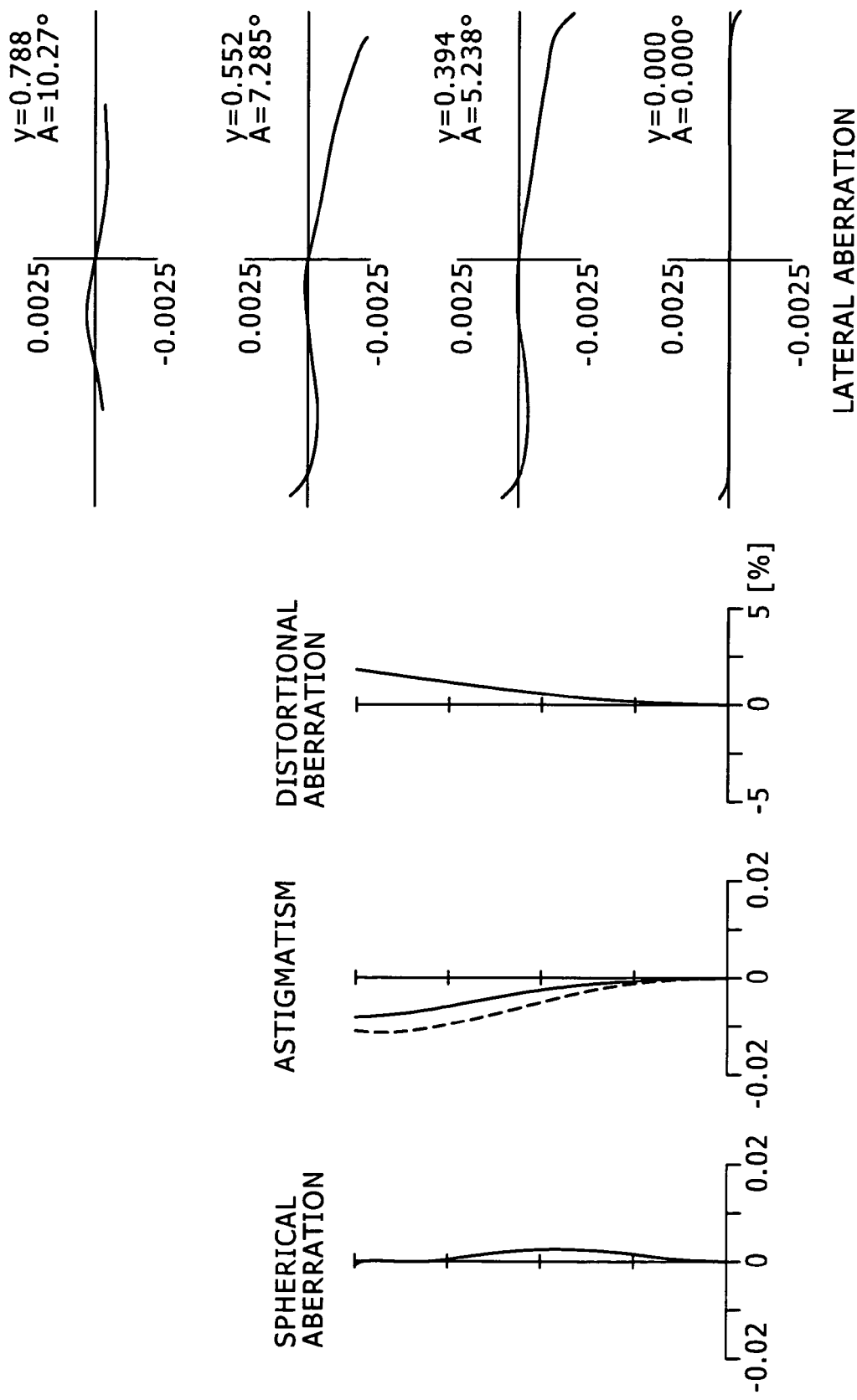
FIG. 14 is a similar view but illustrating a spherical aberration, an astigmatism, a distortional aberration, and lateral aberrations in a first intermediate focal length state of the variable focal length lens system of FIG. 12.
Figure 15:
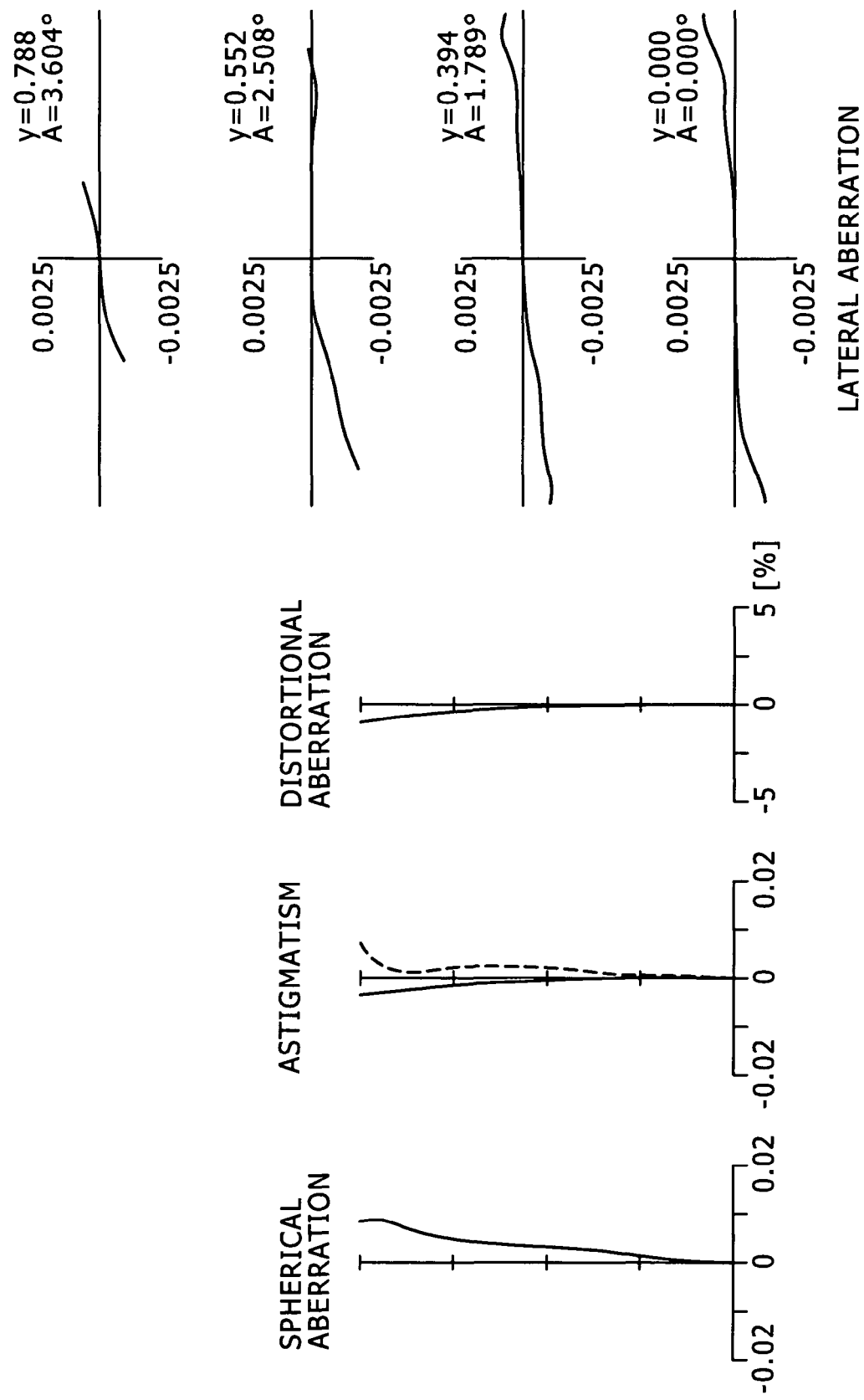
FIG. 15 is a similar view but illustrating a spherical aberration, an astigmatism, a distortional aberration, and lateral aberrations in a second intermediate focal length state of the variable focal length lens system of FIG. 12.
Figure 16:
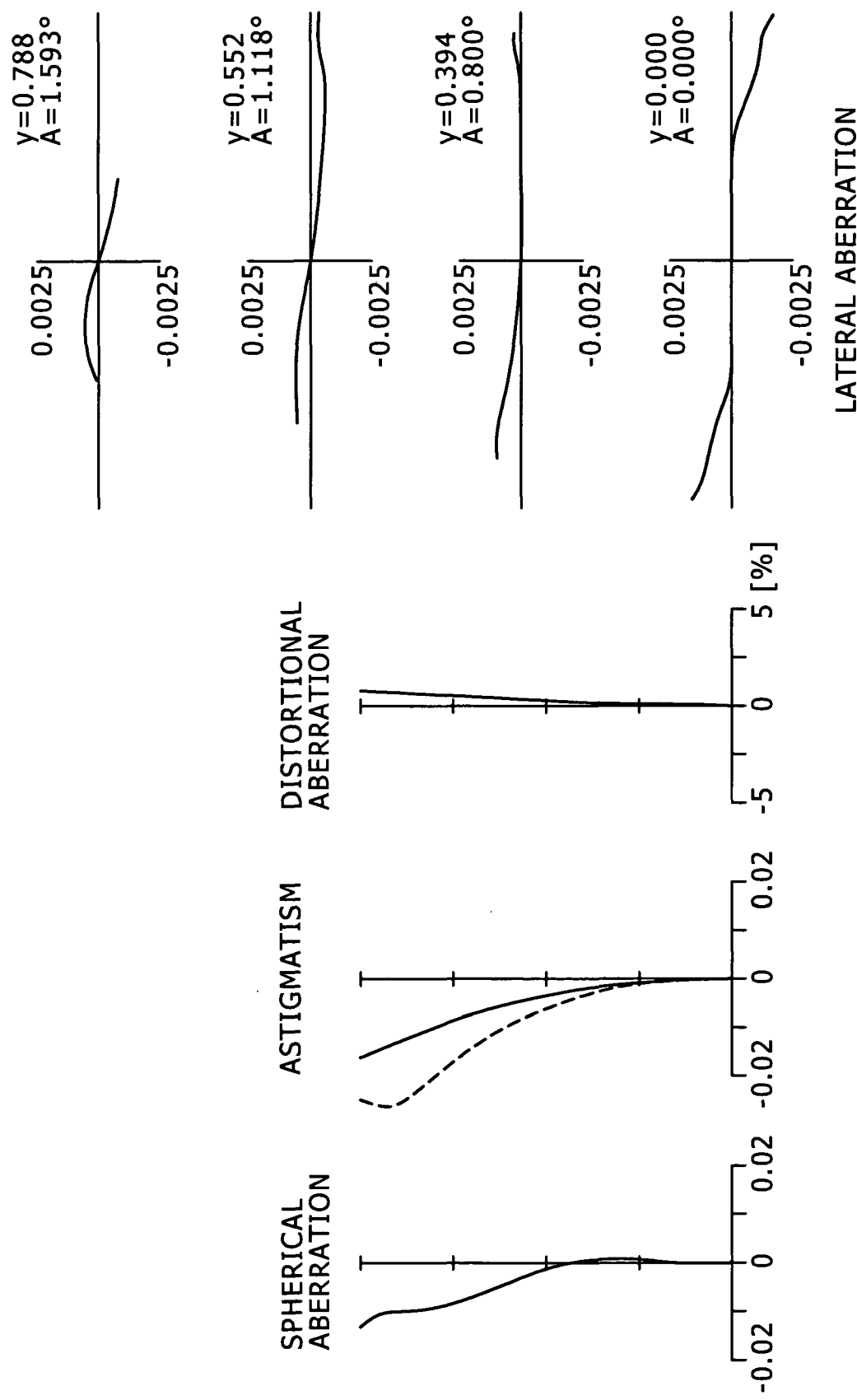
FIG. 16 is a similar view but illustrating a spherical aberration, an astigmatism, a distortional aberration, and lateral aberrations in a telephoto end state of the variable focal length lens system of FIG. 12.

Various aberrations in an infinitely remotely focused state in the numerical value example 3 are illustrated in FIGS. 13 to 16. FIG. 13 illustrates the aberrations in the wide angle end state wherein the focal length f is f=1.000, FIG. 14 the aberrations in a first intermediate focal length state wherein the focal length f is f=4.282, FIG. 15 the aberrations in a second intermediate focal length state wherein the focal length f is f=12.640, and FIG. 16 the aberrations in the telephoto end state wherein the focal length f is f=28.155.

In the views of FIGS. 13 to 16, a solid line curve and a broken line curve of the astigmatism indicate values on the sagittal image plane and the meridional image plane, respectively. In the graphs representing the lateral aberration, y indicates the image height and A the angle of view.

From the graphs of the aberrations, it is apparent that, in the numerical value example 3, the aberrations are corrected favorably and a superior image formation performance is exhibited.

Figure 17:
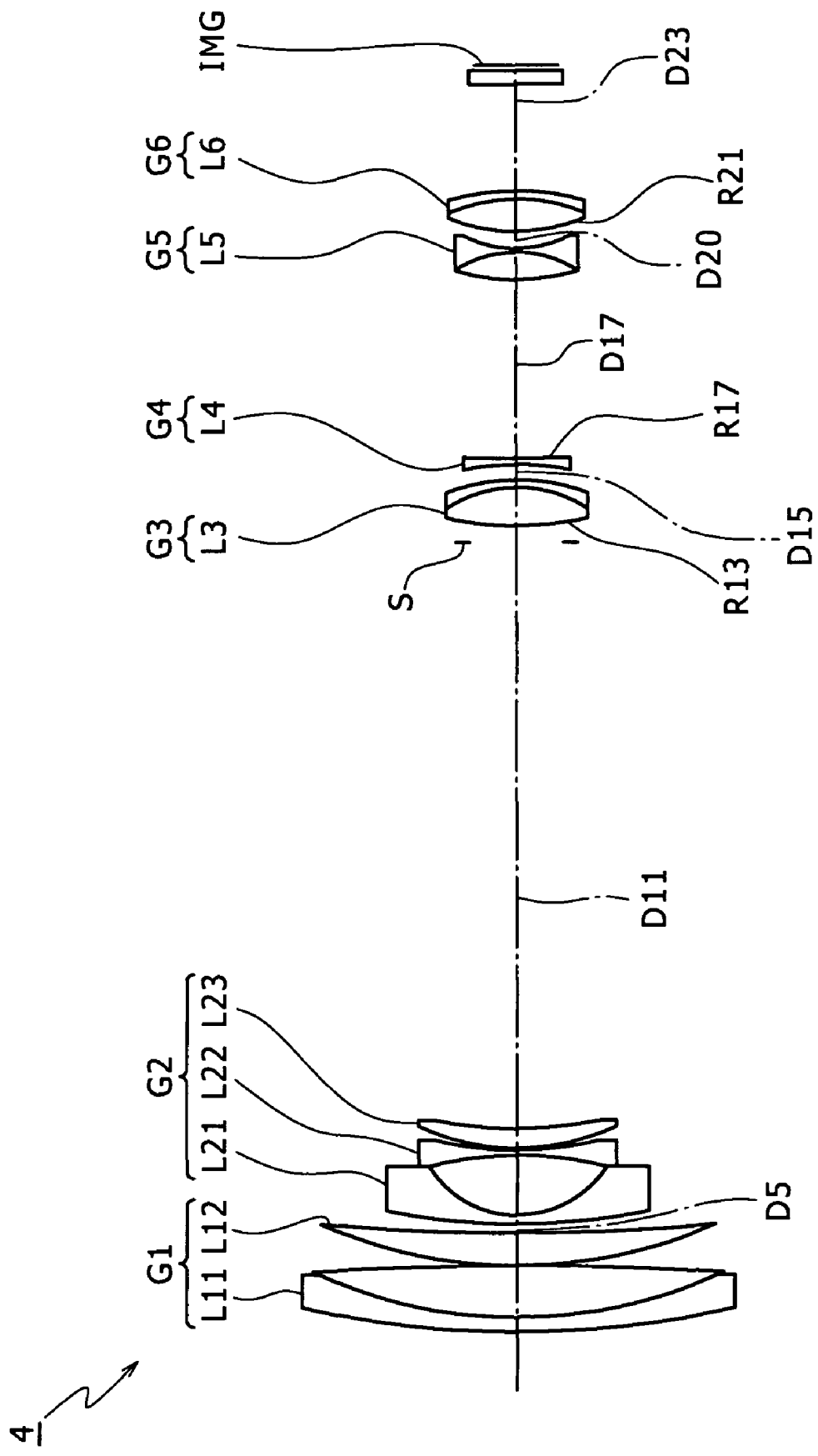
FIG. 17 is a schematic view showing a lens configuration of a variable focal length lens system according to a fourth embodiment of the present invention.

FIG. 17 shows a lens configuration of a variable focal length lens system 4 according to a fourth embodiment of the present invention. Referring to FIG. 17, the variable focal length lens system 4 shown includes 13 lenses.

The first lens group G1 includes a cemented lens L11 of a negative lens of a meniscus shape having a convex face directed to the object side and a positive lens having a convex face directed to the object side, and a positive lens L12 having a convex face directed to the object side.

The second lens group G2 includes a negative lens L21 of a meniscus shape having a concave face direction to the image side, a negative lens L22 of a biconcave shape, and a positive lens L23 of a meniscus shape having a convex face directed to the object side.

The third lens group G3 includes a cemented lens L3 of a positive lens of a biconvex shape and a negative lens of a meniscus shape having a concave face directed to the object side.

The fourth lens group G4 includes a negative lens L4 having a concave face directed to the image side.

The fifth lens group G5 includes a cemented lens L5 of a positive lens of a biconvex shape and a negative lens of a biconcave shape.

The sixth lens group G6 includes a cemented lens L6 of a positive lens of a biconvex shape and a negative lens of a meniscus shape having a concave face directed to the object side.

An aperture stop S is disposed on the object side of the third lens group G3 and moves separately from the third lens group G3 when the lens position state varies.

Table 13 indicates lens data of a numerical value example 4 wherein particular numerical values are applied to the variable focal length lens system 4 of the fourth embodiment together with the F number FNo and the angle 2ω of view in the wide angle end state wherein the focal length f is f=1.000, a first intermediate focal length state wherein the focal length f is f=3.860, a second intermediate focal length state wherein the focal length f is f=11.876 and the telephoto end state wherein the focal length f is f=28.171.

TABLE 13

| f | 1.000~3.860~11.876~28.171 | | | |
|---|---|---|---|---|
| FNO | 2.87~2.95~3.22~4.63 | | | |
| 2ω | 77.92~22.06~7.43~3.07 | | | |
| Face number | Radius of curvature (Ri) | Face distance (Di) | Refractive index (Ni) | Abbe number (vi) |
| 1 | 18.6536 | 0.277 | 1.90366 | 31.1 |
| 2 | 9.8484 | 0.927 | 1.49700 | 81.6 |
| 3 | −54.3931 | 0.040 | | |
| 4 | 8.5725 | 0.641 | 1.60300 | 65.5 |
| 5 | 27.6416 | (D5) | | |
| 6 | 13.5989 | 0.139 | 1.88300 | 40.8 |
| 7 | 2.0326 | 1.044 | | |
| 8 | −7.8501 | 0.119 | 1.77250 | 49.6 |
| 9 | 6.8087 | 0.023 | | |
| 10 | 3.7520 | 0.416 | 1.94595 | 18.0 |
| 11 | 9.1735 | (D11) | | |
| 12 (Aperture stop) | 0.0000 | (D12) | | |
| 13 (ASP) | 4.9316 | 0.661 | 1.69680 | 55.5 |
| 14 | −2.4130 | 0.119 | 1.68893 | 31.1 |
| 15 | −4.8632 | (D15) | | |
| 16 | −5.5705 | 0.119 | 1.55332 | 71.7 |
| 17 (ASP) | 14.9629 | (D17) | | |
| 18 | 4.3855 | 0.434 | 1.61800 | 63.4 |
| 19 | −2.8631 | 0.099 | 1.59551 | 39.2 |
| 20 | 2.4746 | (D20) | | |
| 21 (ASP) | 3.1282 | 0.625 | 1.61800 | 63.4 |
| 22 | −3.0828 | 0.109 | 1.90366 | 31.1 |
| 23 | −5.2078 | (D23) | | |
| 24 | 0.0000 | 0.184 | 1.51680 | 64.2 |
| 25 | 0.0000 | (Bf) | | |

In the variable focal length lens system 4, a face of the cemented lens L3 of the third lens group G3 on the object side, that is, the face of the face number 13, a face of the negative lens L4 of the fourth lens group G4 on the image side, that is, the face of the face number 17 and a face of the cemented lens L6 of the sixth lens group G6 on the object side, that is, the face of the face number 21, are formed as aspheric faces.

The fourth-, sixth-, eighth-, and tenth-order aspheric coefficients A, B, C, and D of the aspheric faces in the numerical value example 4 are indicated in Table 14 together with the constant "κ" of the cone.

TABLE 14

| | | | | | |
|---|---|---|---|---|---|
| 13th face | κ = 2.000000 | A = −0.743296E−02 | B = −0.286011E−03 | C = −0.602466E−04 | D = 0.166653E−04 |
| 17th face | κ = 0.000000 | A = −0.405800E−02 | B = 0.110574E−02 | C = −0.106782E−02 | D = 0.000000E+00 |
| 21st face | κ = −2.426127 | A = 0.452525E−02 | B = 0.100273E−02 | C = −0.763468E−03 | D = 0.174763E−03 |

The variation distance when the lens position state varies in the numerical value example 4 is indicated in Table 15.

TABLE 15

| f | 1.000 | 3.860 | 11.876 | 28.171 |
|---|---|---|---|---|
| D5 | 0.148 | 5.436 | 9.256 | 10.736 |
| D11 | 10.962 | 2.949 | 0.750 | 0.396 |
| D12 | 0.359 | 1.317 | 0.839 | 0.485 |
| D15 | 0.317 | 1.734 | 2.797 | 3.151 |
| D17 | 3.384 | 1.967 | 0.904 | 0.550 |
| D20 | 0.356 | 1.360 | 1.849 | 3.788 |
| D23 | 2.090 | 2.515 | 3.076 | 1.503 |
| Bf | 0.119 | 0.119 | 0.119 | 0.119 |

Corresponding values of the conditional expressions (1) to (7) in the numerical value example 4 are indicated in Table 16.

TABLE 16

| | |
|---|---|
| | γmax = 0.768 |
| | β2W = −0.182 |
| | β2t = −1.506 |
| | f14w = 2.012 |
| | f12t = −23.119 |
| Conditional expression (1) | f14w/fw = 2.012 |
| Conditional expression (2) | β2w = −0.182 |
| Conditional expression (3) | β2t = −1.506 |
| Conditional expression (4) | TLt/ft = 0.948 |
| Conditional expression (5) | TLw/TLt = 0.888 |
| Conditional expression (6) | Bfw/γmax = 3.033 |
| Conditional expression (7) | |f12t|/ft = 0.821 |

As apparent from Table 16, the variable focal length lens system 4 is configured so as to satisfy the conditional expressions (1) to (7).

Figure 18:
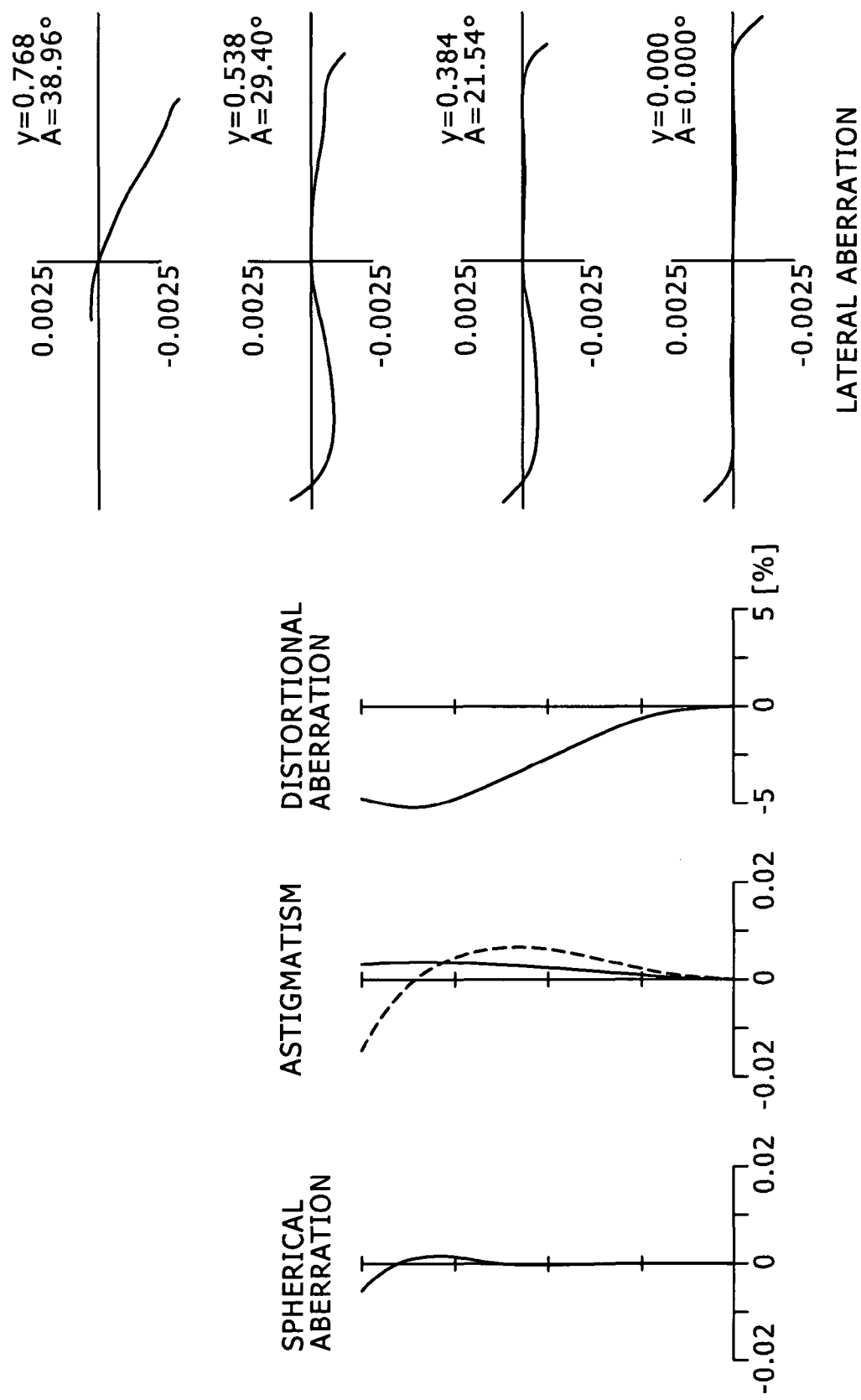
FIG. 18 is a diagrammatic view illustrating a spherical aberration, an astigmatism, a distortional aberration, and lateral aberrations in a wide angle end state of the variable focal length lens system of FIG. 17 according to a numerical value example wherein particular numerical values are applied to the variable focal length lens system.
Figure 19:
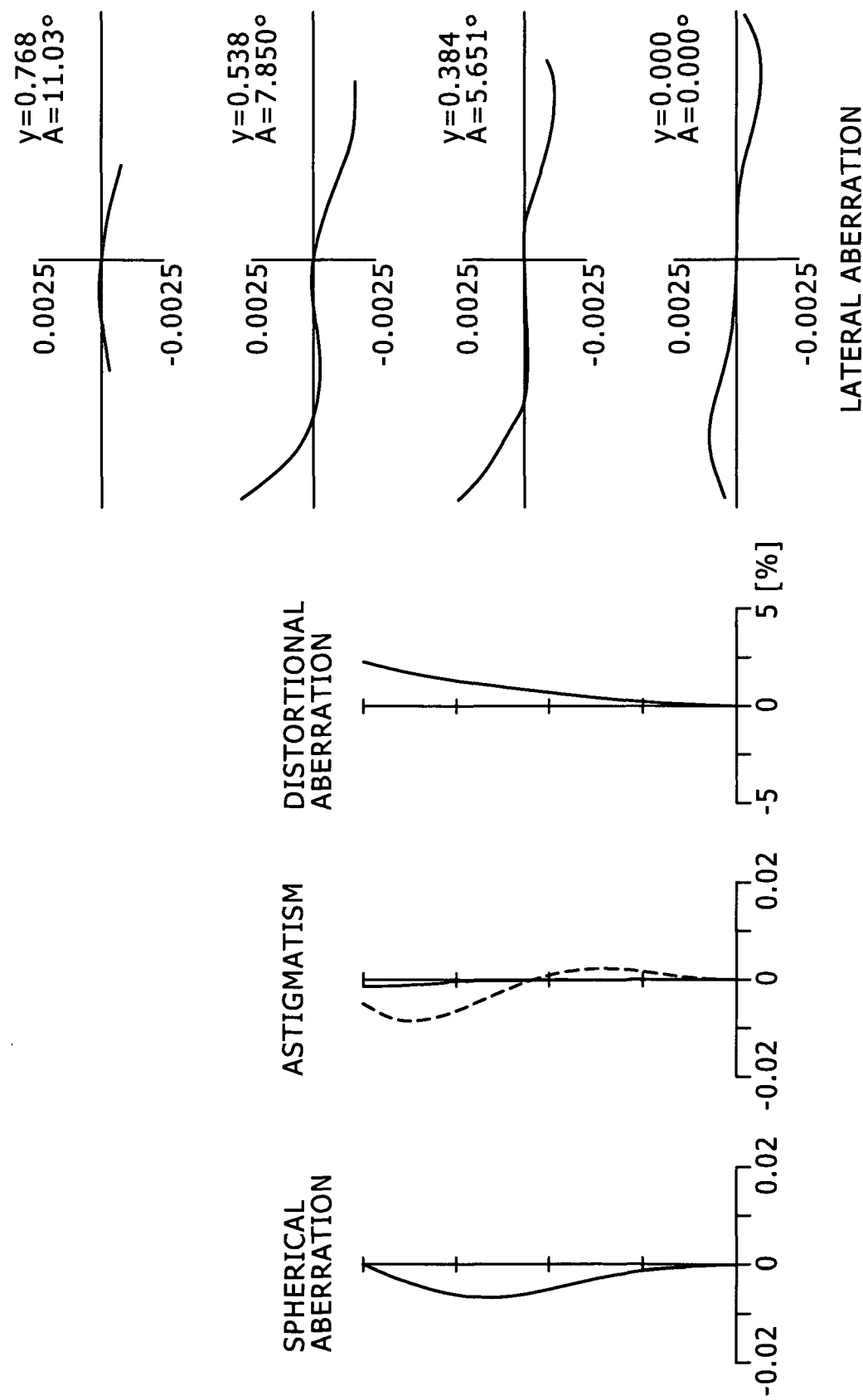
FIG. 19 is a similar view but illustrating a spherical aberration, an astigmatism, a distortional aberration, and lateral aberrations in a first intermediate focal length state of the variable focal length lens system of FIG. 17.
Figure 20:
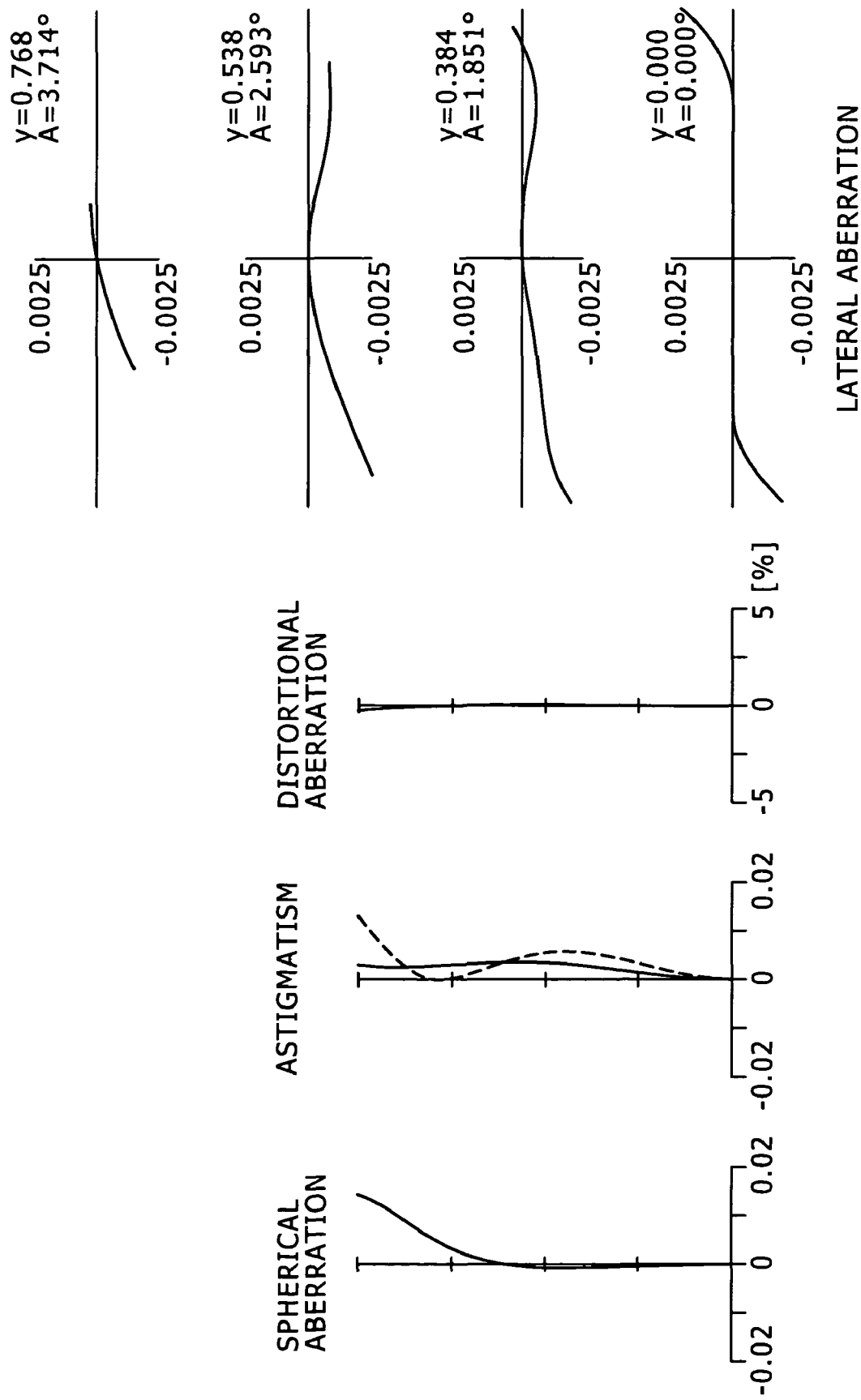
FIG. 20 is a similar view but illustrating a spherical aberration, an astigmatism, a distortional aberration, and lateral aberrations in a second intermediate focal length state of the variable focal length lens system of FIG. 17.
Figure 21:
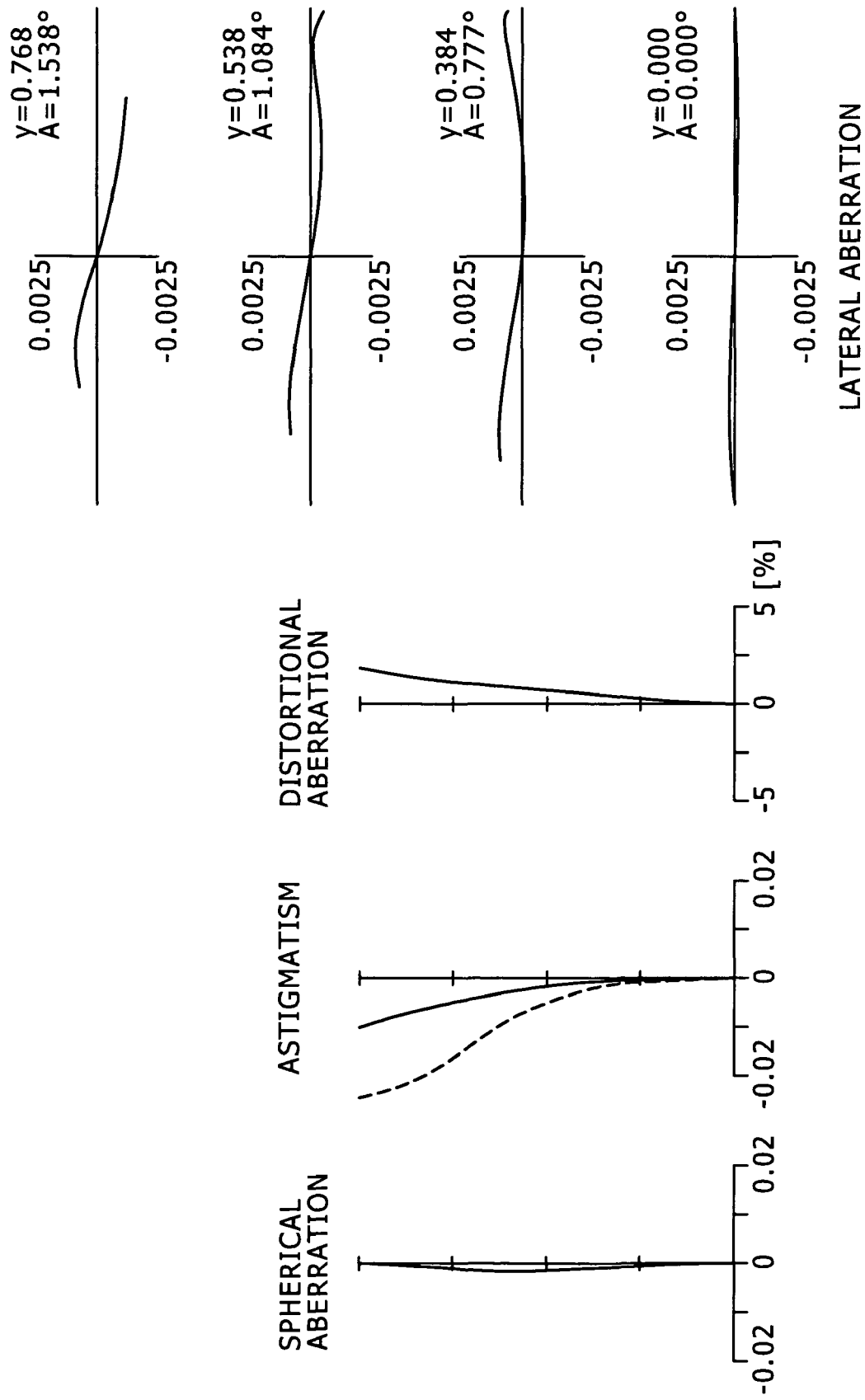
FIG. 21 is a similar view but illustrating a spherical aberration, an astigmatism, a distortional aberration, and lateral aberrations in a telephoto end state of the variable focal length lens system of FIG. 17.

Various aberrations in an infinitely remotely focused state in the numerical value example 4 are illustrated in FIGS. 18 to 21. FIG. 18 illustrates the aberrations in the wide angle end state wherein the focal length f is f=1.000, FIG. 19 the aberrations in a first intermediate focal length state wherein the focal length f is f=3.860, FIG. 20 the aberrations in a second intermediate focal length state wherein the focal length f is f=11.876, and FIG. 21 the aberrations in the telephoto end state wherein the focal length f is f=28.171.

In the views of FIGS. 18 to 21, a solid line curve and a broken line curve of the astigmatism indicate values on the sagittal image plane and the meridional image plane, respectively. In the graphs representing the lateral aberration, y indicates the image height and A the angle of view.

From the graphs of the aberrations, it is apparent that, in the numerical value example 4, the aberrations are corrected favorably and a superior image formation performance is exhibited.

The particular shapes and numerical values of the components of the embodiments described above are mere examples in embodying the present invention and the technical scope of the present invention shall not be interpreted restrictively depending upon them.

The present application contains subject matter related to that disclosed in Japanese Priority Patent Application JP 2008-202967 filed in the Japan Patent Office on Aug. 6, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A variable focal length lens system, comprising:
a first lens group having a positive refracting power;
a second lens group having a negative refracting power;
a third lens group having a positive refracting power;
a fourth lens group having a negative refracting power;
a fifth lens group having a negative refracting power; and
a sixth lens group having a positive refracting power;
said first to sixth lens groups being disposed in order from an object side;
variation of a lens position state from a wide angle end state to a telephoto end state causing increase of the distance between said first and second lens groups, decrease of the distance between said second and third lens groups, increase of the distance between said third and fourth lens groups, decrease of the distance between said fourth and fifth lens groups, and variation of the distance between said fifth and sixth lens groups while said first lens group first moves to an image side once and then moves to the object side and said fourth lens group is fixed in the direction of the optical axis and besides said third and fifth lens groups move integrally with each other to the object side;
said second lens group being positioned on the image side in the telephoto end state in comparison with the position thereof in the wide angle end state;
said variable focal length lens system further including an aperture stop disposed in the proximity of said third lens group; and
said sixth lens group being moved in the direction of the optical axis in response to variation of the position of an image pickup object.

2. The variable focal length lens system according to claim 1, wherein, where the combined focal length of said first to fourth lens groups in the wide angle end state is represented by f14w and the focal length of the entire lens system in the wide angle end state is represented by fw, the following conditional expression (1) is satisfied:

$$1.2 < f14w/fw < 3. \tag{1}$$

3. The variable focal length lens system according to claim 1, wherein, where the lateral magnifying power of said second lens group in the wide angle end state is represented by β2w and the lateral magnifying power of said second lens group in the telephoto end state is represented by β2t, the following conditional expressions (2) and (3) are satisfied:

$$-1 < \beta 2w < 0 \quad (2)$$

$$\beta 2t < -1. \quad (3)$$

4. The variable focal length lens system according to claim 1, wherein, where an optical overall length which is the distance from a lens face of said first lens group positioned nearest to the object side to an image surface in the telephoto end state is represented by TLt, the focal length of the entire lens system in the telephoto end state is represented by ft, and an optical overall length which is the distance from the lens face of said first lens group positioned nearest to the object side to the image surface in the wide angle end state is represented by TLw, the following conditional expressions (4) and (5) are satisfied:

$$0.8 < TLt/ft < 1 \quad (4)$$

$$0.8 < TLw/TLt < 1. \quad (5)$$

5. The variable focal length lens system according to claim 1, wherein, where a back focus which is the distance from a lens face of said sixth lens group positioned nearest to the image side to an image surface in the wide angle end state is represented by Bfw and a maximum image height is represented by Ymax, the following conditional expression (6) is satisfied:

$$1.5 < Bfw/Y\max < 4. \quad (6)$$

6. The variable focal length lens system according to claim 1, wherein, where the combined focal length of said first and second lens groups in the telephoto end state is represented by f12t and the focal length of the entire lens system in the telephoto end state is represented by ft, the following conditional expression (7) is satisfied:

$$0.7 < |f12t|/ft < 1. \quad (7)$$

* * * * *